(12) United States Patent
Yamada et al.

(10) Patent No.: US 7,626,723 B2
(45) Date of Patent: Dec. 1, 2009

(54) COLOR-CONVERSION-TABLE CREATING METHOD

(75) Inventors: Ryuji Yamada, Oogaki (JP); Masaki Kondo, Toyoake (JP); Yasunari Yoshida, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 739 days.

(21) Appl. No.: 11/065,453

(22) Filed: Feb. 25, 2005

(65) Prior Publication Data

US 2005/0190390 A1 Sep. 1, 2005

(30) Foreign Application Priority Data

Feb. 27, 2004 (JP) .............................. 2004-055289

(51) Int. Cl.
G06F 15/00 (2006.01)
G03F 3/08 (2006.01)
H04N 1/46 (2006.01)
G06K 9/00 (2006.01)

(52) U.S. Cl. ........................ 358/1.9; 358/520; 358/525; 358/534; 382/167

(58) Field of Classification Search ................. 358/1.9, 358/504, 518, 520, 523, 525, 530, 535, 539, 358/534; 382/162, 167
See application file for complete search history.

(56) References Cited

U.S. PATENT DOCUMENTS

| | | | | |
|---|---|---|---|---|
| 5,553,199 | A * | 9/1996 | Spaulding et al. | 358/1.9 |
| 5,721,572 | A * | 2/1998 | Wan et al. | 345/590 |
| 5,731,818 | A * | 3/1998 | Wan et al. | 345/590 |
| 5,835,624 | A | 11/1998 | Ueda et al. | |
| 6,313,925 | B1 * | 11/2001 | Decker et al. | 358/1.9 |
| 6,611,356 | B1 * | 8/2003 | Shimizu et al. | 358/1.9 |
| 6,724,500 | B1 * | 4/2004 | Hains et al. | 358/1.9 |
| 6,867,883 | B1 * | 3/2005 | Cholewo et al. | 358/1.9 |
| 7,142,710 | B2 * | 11/2006 | Hung | 382/162 |
| 7,233,413 | B2 * | 6/2007 | Jones et al. | 358/1.9 |
| 2003/0090726 | A1 * | 5/2003 | Arai | 358/2.1 |
| 2004/0096104 | A1 * | 5/2004 | Terekhov | 382/167 |
| 2004/0109180 | A1 * | 6/2004 | Braun et al. | 358/1.9 |
| 2004/0183814 | A1 * | 9/2004 | Saito | 345/601 |
| 2006/0245016 | A1 * | 11/2006 | Fukao et al. | 358/518 |

FOREIGN PATENT DOCUMENTS

| | | |
|---|---|---|
| JP | A-2-214266 | 8/1990 |
| JP | A-3-158075 | 7/1991 |
| JP | A-09-116776 | 5/1997 |
| JP | A-11-4353 | 1/1999 |
| JP | A-11-155076 | 6/1999 |
| JP | A-2000-134487 | 5/2000 |

\* cited by examiner

*Primary Examiner*—Madeleine A Nguyen
(74) *Attorney, Agent, or Firm*—Oliff & Berridge, PLC

(57) ABSTRACT

A color-conversion-table creating method includes (a) defining a color gamut in a first color space defined for a first device, the color gamut having a surface, an internal space surrounded by the surface, surface grid points positioned on the surface, and internal grid points positioned in the internal space, and determining a correspondence relationship between the surface grid points in the first color space and parameters in a second color space defined for a second device, (b) determining, based on the correspondence relationship determined in step (a), a correspondence relationship between the internal grid points in the first color space and parameters in the second color space, and (c) creating a color conversion table indicative of a correspondence relationship between all grid points in the first color space and parameters in the second color space based on both the correspondence relationship determined in step (a) and the correspondence relationship determined in step (b).

8 Claims, 14 Drawing Sheets

FIG.1(a)
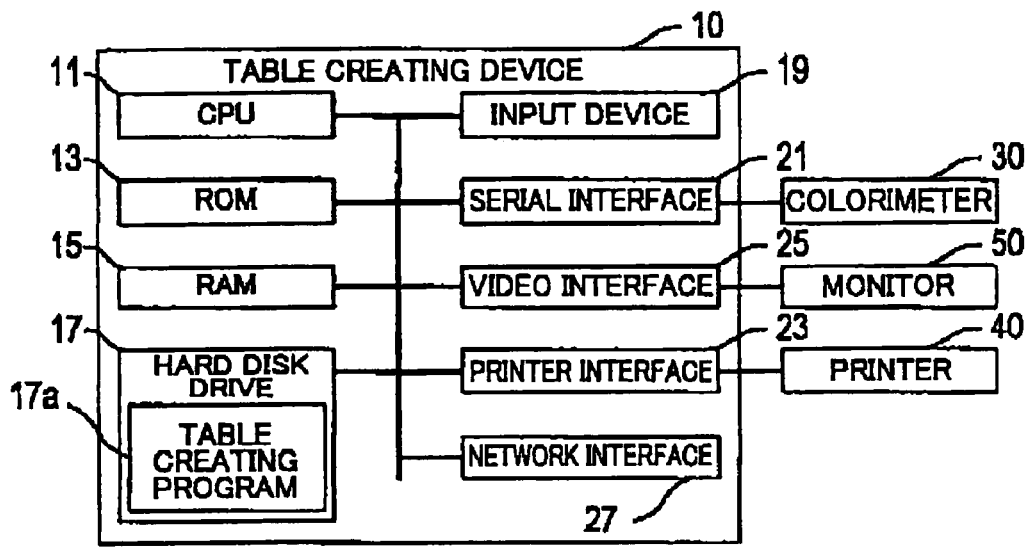
FIG.1(b)
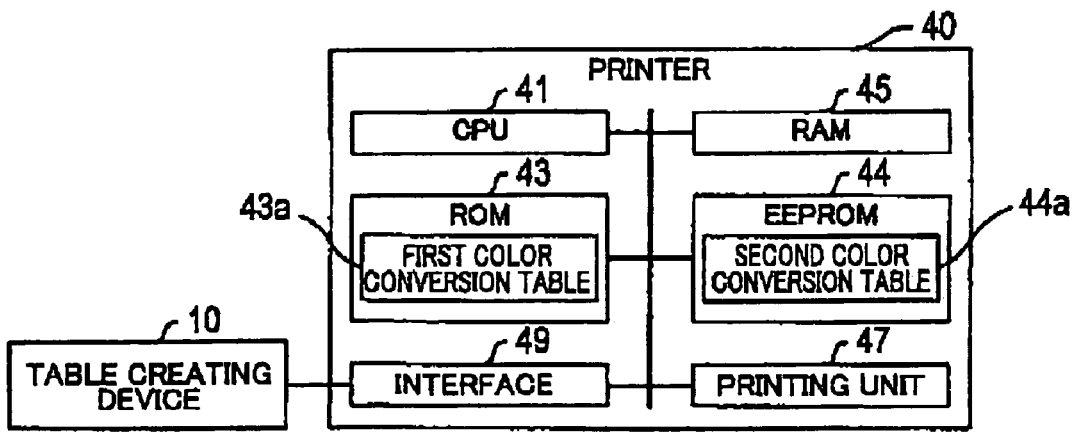
FIG.2

RGB COLOR SPACE

FIG.7

BASIC TABLE

|  | RGB COLOR SPACE | | | CMYK COLOR SPACE | | | |
|---|---|---|---|---|---|---|---|
|  | R | G | B | C | M | Y | K |
| GRID POINTS IN SURFACE P0P1P6P5 | 255 | 0 | 0 | * | * | * | * |
|  | ⋮ | ⋮ | 0 | * | * | * | * |
|  | ⋮ | ⋮ | ⋮ | * | * | * | * |
|  | ⋮ | ⋮ | 0 | * | * | * | * |
| GRID POINTS IN SURFACE P0P5P4P7 | 0 | 255 | 0 | * | * | * | * |
|  | 0 | ⋮ | ⋮ | * | * | * | * |
|  | ⋮ | ⋮ | ⋮ | * | * | * | * |
|  | 0 | ⋮ | ⋮ | * | * | * | * |
| GRID POINTS IN SURFACE P7P2P3P4 | 0 | 0 | 255 | * | * | * | * |
|  | ⋮ | ⋮ | 255 | * | * | * | * |
|  | ⋮ | ⋮ | ⋮ | * | * | * | * |
|  | ⋮ | ⋮ | 255 | * | * | * | * |
| GRID POINTS ALONG ACHROMATIC AXIS P0P3 | 255 | 255 | 255 | 0 | 0 | 0 | 0 |
|  | 255-a | 255-a | 255-a | * | * | * | * |
|  | 255-b | 255-b | 255-b | * | * | * | * |
|  | ⋮ | ⋮ | ⋮ | * | * | * | * |
| GRID POINTS IN SURFACE P0P1P2P7 | 0 | 0 | 0 | * | * | * | * |
|  | ⋮ | 0 | ⋮ | * | * | * | * |
|  | ⋮ | ⋮ | ⋮ | * | * | * | * |
|  | ⋮ | 0 | ⋮ | * | * | * | * |
| GRID POINTS IN SURFACE P1P2P3P6 | 255 | 0 | 255 | * | * | * | * |
|  | 255 | ⋮ | ⋮ | * | * | * | * |
|  | ⋮ | ⋮ | ⋮ | * | * | * | * |
|  | 255 | ⋮ | ⋮ | * | * | * | * |
| GRID POINTS IN SURFACE P6P3P4P5 | 255 | 255 | 0 | * | * | * | * |
|  | ⋮ | 255 | ⋮ | * | * | * | * |
|  | ⋮ | 255 | ⋮ | * | * | * | * |
|  | ⋮ | ⋮ | ⋮ | * | * | * | * |

COLOR-CONVERSION-TABLE CREATING METHOD

BACKGROUND OF THE INVENTION

1. Field of the Invention

The present invention relates to a method and device for creating a color conversion table for converting image data represented in a first color space used by a first device into image data represented in a second color space used by a second device. The present invention also relates to a computer program for creating the color conversion table, the color conversion table itself, a color conversion device provided with the color conversion table, and an image forming system provided with the color conversion device.

2. Description of Related Art

Methods for representing colors that are well known in the art include a method for representing colors in a device-dependent color space that produces different colors depending on the device, and a method for representing colors in a device-independent color space that is not dependent on any device. Device-dependent color spaces known in the art include the RGB and CMYK color spaces. Device-independent color spaces known in the art include the XYZ and Lab color spaces.

When outputting images on devices that work with a device-dependent color space, images outputted on different devices will have differences in color, even when the inputted image data is the same. Hence, color matching between devices is generally performed when, for example, image data specific to a first device is inputted into a second device for output, in order that the image outputted from the second-device matches the color of the image on the first device.

One such method of color matching is disclosed in Japanese patent-application publication No. HEI-9-116776. This method determines a correspondence relationship between a device-independent color space and a device-dependent color space used by the first device (hereinafter referred to as the "first color space") and determines a correspondence relationship between a device-independent color space and a device-dependent color space used by the second device (hereinafter referred to as the "second color space"). The method then obtains a correspondence relationship between parameters in the first color space (such as RGB values in the RGB color space) corresponding to each color in the device-independent color space and parameters in the second color space (such as CMYK values in the CMYK color space) corresponding to the same colors.

SUMMARY OF THE INVENTION

However, when performing color matching according to the above-described method, it is necessary to perform color conversion between the first color space and the device-independent color space and between the device-independent color space and the second color space. This method of color matching requires a large number of calculations, resulting in a lengthy processing time.

Further, if differences exist between the color gamut of the first color space used by the first device and the color gamut of the second color space used by the second device, colors cannot be perfectly matched between the devices when performing color matching. Accordingly, an image based on image data generated by the first device cannot always be outputted from the second device in the intended colors.

More specifically, when the first color space and second color space have different color gamuts, colors that cannot be represented in a color space are converted to colors that can be represented through color compression. However, this type of color compression can produce irregularities in tones.

As a specific example, let us say the first device is a monitor that outputs RGB colors, and the second device is a printer that outputs CMYK colors. In this case, there is a large difference between the color gamut that can be represented on the monitor and the color gamut that can be represented on the printer. Hence, when converting colors between the first color space and the second color space via a device-independent color space, irregularities are produced in the tones that greatly worsen the quality of the outputted image.

In view of the foregoing, it is an object of the present invention to provide a method, a device, and computer program that, with a low processing load, can produce an appropriate color conversion table for converting image data represented in a first color space used by a first device into image data represented in a second color space used by a second device. It is another object of the present invention to provide a color conversion table produced through the method, a color conversion device that uses the color conversion table, and an image forming system employing the color conversion device.

In order to attain the above and other objects, the present invention provides a color-conversion-table creating method. The color-conversion-table creating method includes (a) defining a color gamut in a first color space defined for a first device, the color gamut having a surface, an internal space surrounded by the surface, surface grid points positioned on the surface, and internal grid points positioned in the internal space, and determining a correspondence relationship between the surface grid points in the first color space and parameters in a second color space defined for a second device, (b) determining, based on the correspondence relationship determined in step (a), a correspondence relationship between the internal grid points in the first color space and parameters in the second color space, and (c) creating a color conversion table indicative of a correspondence relationship between all grid points in the first color space and parameters in the second color space based on both the correspondence relationship determined in step (a) and the correspondence relationship determined in step (b). The all grid points include the surface grid points and the internal grid points, allowing the color conversion table to be used for converting image data represented in the first color space into image data represented in the second color space.

The present invention also provides a color-conversion-table creating method. The color-conversion-table creating method includes (a) defining a color gamut in a first color space defined for a first device, the color gamut having a surface, an internal space surrounded by the surface, an achromatic axis defined in the internal space, surface grid points positioned on the surface, achromatic grid points positioned on the achromatic axis, and chromatic grid points positioned in the internal space and shifted from the achromatic axis, and determining a first correspondence relationship between the surface grid points in the first color space and parameters in a second color space defined for a second device, and determining a second correspondence relationship between the achromatic grid points in the first color space and parameters in the second color space, (b) determining a third correspondence relationship between the chromatic grid points in the first color space and parameters in the second color space, based on both the first correspondence relationship and the second correspondence relationship, and (c) creating a color conversion table indicative of a correspondence relationship between all grid points in the first color space and parameters in the second color space based on the first correspondence relationship, the second correspondence relationship, and the third correspondence relationship, the all grid points including the surface grid points, the achromatic grid points, and the chromatic grid points, allowing the color conversion table to be used for converting image data represented in the first color space into image data represented in the second color space.

The present invention also provides a color-conversion-table creating device. The color-conversion-table creating device includes a first determining portion, a second determining portion, and a creating portion. The first determining portion defines a color gamut in a first color space defined for a first device. The color gamut has a surface, an internal space surrounded by the surface, surface grid points positioned on the surface, and internal grid points positioned in the internal space. The first determining portion determines a correspondence relationship between the surface grid points in the first color space and parameters in a second color space defined for a second device. The second determining portion determines, based on the correspondence relationship determined by the first determining portion, a correspondence relationship between the internal grid points in the first color space and parameters in the second color space. The creating portion creates a color conversion table indicative of a correspondence relationship between all grid points in the first color space and parameters in the second color space based on both the correspondence relationship determined by the first determining portion and the correspondence relationship determined by the second determining portion. The all grid points include the surface grid points and the internal grid points. The color conversion table can be used for converting image data represented in the first color space into image data represented in the second color space.

The present invention also provides color-conversion-table creating device. The color-conversion-table creating device includes a first determining portion, a second determining portion, and a creating portion. The first determining portion defines a color gamut in a first color space defined for a first device. The color gamut has a surface, an internal space surrounded by the surface, an achromatic axis defined in the internal space, surface grid points positioned on the surface, achromatic grid points positioned on the achromatic axis, and chromatic grid points positioned in the internal space and shifted from the achromatic axis. The first determining portion determines a first correspondence relationship between the surface grid points in the first color space and parameters in a second color space defined for a second device, and determines a second correspondence relationship between the achromatic grid points in the first color space and parameters in the second color space. The second determining portion determines a third correspondence relationship between the chromatic grid points in the first color space and parameters in the second color space, based on both the first correspondence relationship and the second correspondence relationship. The creating portion creates a color conversion table indicative of a correspondence relationship between all grid points in the first color space and parameters in the second color space based on the first correspondence relationship, the second correspondence relationship, and the third correspondence relationship. The all grid points include the surface grid points, the achromatic grid points, and the chromatic grid points. The color conversion table can be used for converting image data represented in the first color space into image data represented in the second color space.

The present invention also provides a storage medium for storing a color-conversion-table creating program. The color-conversion-table creating program implements the steps of (a) defining a color gamut in a first color space defined for a first device, the color gamut having a surface, an internal space surrounded by the surface, surface grid points positioned on the surface, and internal grid points positioned in the internal space, and determining a correspondence relationship between the surface grid points in the first color space and parameters in a second color space defined for a second device, (b) determining, based on the correspondence relationship determined in step (a), a correspondence relationship between the internal grid-points in the first color space and parameters in the second color space, and (c) creating a color conversion table indicative of a correspondence relationship between all grid points in the first color space and parameters in the second color space based on both the correspondence relationship determined in step (a) and the correspondence relationship determined in step (b), the all grid points including the surface grid points and the internal grid points, allowing the color conversion table to be used for converting image data represented in the first color space into image data represented in the second color space.

The present invention also provides a color conversion table created by a color-conversion-table creating method. The color-conversion-table creating method includes (a) defining a color gamut in a first color space defined for a first device, the color gamut having a surface, an internal space surrounded by the surface, surface grid points positioned on the surface, and internal grid points positioned in the internal space, and determining a correspondence relationship between the surface grid points in the first color space and parameters in a second color space defined for a second device, (b) determining, based on the correspondence relationship determined in step (a), a correspondence relationship between the internal grid points in the first color space and parameters in the second color space, and (c) creating a color conversion table indicative of a correspondence relationship between all grid points in the first color space and parameters in the second color space based on both the correspondence relationship determined in step (a) and the correspondence relationship determined in step (b), the all grid points including the surface grid points and the internal grid points, allowing the color conversion table to be used for converting image data represented in the first color space into image data represented in the second color space.

The present invention also provides a color conversion device. The color conversion device includes a table storing portion storing a color conversion table created by a color-conversion-table creating method, the method including (a) defining a color gamut in a first color space defined for a first device, the color gamut having a surface, an internal space surrounded by the surface, surface grid points positioned on the surface, and internal grid points positioned in the internal space, and determining a correspondence relationship between the surface grid points in the first color space and parameters in a second color space defined for a second device, (b) determining, based on the correspondence relationship determined in step (a), a correspondence relationship between the internal grid points in the first color space and parameters in the second color space, and (c) creating a color conversion table indicative of a correspondence relationship between all grid points in the first color space and parameters in the second color space based on both the correspondence relationship determined in step (a) and the correspondence relationship determined in step (b), the all grid points including the surface grid points and the internal grid points, allowing the color conversion table to be used for converting image data represented in the first color space into image data represented in the second color space, and a color converting portion converting the image data represented in the first color space inputted from the first device into the image data represented in the second color space based on the color conversion table stored in the table storing portion.

The present invention also provides a color conversion device. The color conversion device includes a table storing portion, a determining portion, and a color converting portion. The table storing portion stores a color conversion table indicative of a correspondence relationship between surface grid points in a first color space defined for a first device and parameters in a second color space defined for a second device. The surface grid points are positioned on a surface of a color gamut defined in the first color space. The determining portion determines, based on the color conversion table stored in the table storing portion, a correspondence relationship between internal grid points in the first color space and parameters in the second color space. The internal grid points are positioned in an internal space surrounded by the surface and shifted from the surface. The color converting portion converts image data represented in the first color space inputted from the first device into image data represented in the second color space based both on the color conversion table stored in the table storing portion and on the correspondence relationship determined by the determining portion.

The present invention also provides a color conversion device. The color conversion device includes a table storing portion, a determining portion, and a color converting portion. The table storing portion stores a color conversion table indicative both of a correspondence relationship between surface grid points in a first color space defined for a first device and parameters in a second color space defined for a second device and of a correspondence relationship between achromatic grid points in the first color space and parameters in the second color space. The surface grid points are positioned on a surface of a color gamut defined in the first color space. The achromatic grid points are positioned on an achromatic axis defined in an internal space surrounded by the surface. The determining portion determines, based on the color conversion table stored in the table storing portion, a correspondence relationship between chromatic grid points in the first color space and parameters in the second color space. The chromatic grid points are positioned in the internal space and shifted both from the surface and from the achromatic axis. The color converting portion converts image data represented in the first color space inputted from the first device into image data represented in the second color space based both on the color conversion table stored in the table storing portion and on the correspondence relationship determined by the determining portion.

The present invention also provides an image forming system. The image forming system includes a color conversion device and an image forming device. The color conversion device includes a table storing portion and a color converting portion. The table storing portion stores a color conversion table created by a color-conversion-table creating method. The color-conversion-table creating method includes (a) defining a color gamut in a first color space defined for a first device, the color gamut having a surface, an internal space surrounded by the surface, surface grid points positioned on the surface, and internal grid points positioned in the internal space, and determining a correspondence relationship between the surface grid points in the first color space and parameters in a second color space defined for a second device, (b) determining, based on the correspondence relationship determined in step (a), a correspondence relationship between the internal grid points in the first color space and parameters in the second color space, and (c) creating a color conversion table indicative of a correspondence relationship between all grid points in the first color space and parameters in the second color space based on both the correspondence relationship determined in step (a) and the correspondence relationship determined in step (b), the all grid points including the surface grid points and the internal grid points, allowing the color conversion table to be used for converting image data represented in the first color space into image data represented in the second color space. The color converting portion converts the image data represented in the first color space inputted from the first device into the image data represented in the second color space based on the color conversion table stored in the table storing portion. The image forming device forms images on a recording medium based on the image data converted into the second color space by the color conversion device.

BRIEF DESCRIPTION OF THE DRAWINGS

The above and other objects, features and advantages of the invention will become more apparent from reading the following description of the embodiments taken in connection with the accompanying drawings in which:

FIG. 1(a) is a block diagram showing a table creating device according to an embodiment of the present invention;

FIG. 1(b) is a block diagram showing a printer according to the embodiment;

FIG. 2 is an explanatory diagram showing a color conversion table;

FIG. 7 is an explanatory diagram showing a basic table;

DETAILED DESCRIPTION OF THE PREFERRED EMBODIMENTS

Figure 3:
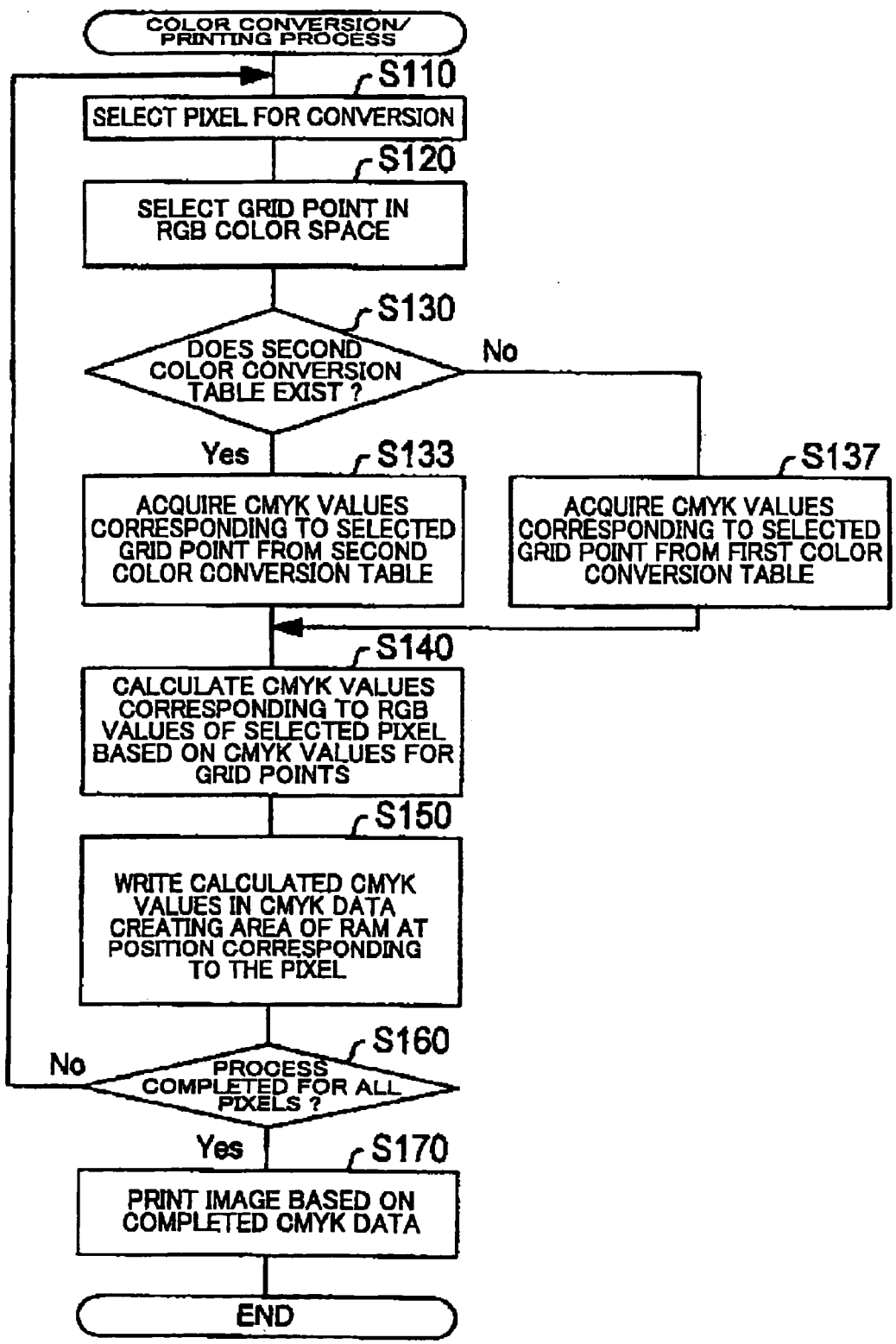
FIG. 3 is a flowchart showing steps in a color conversion/printing process executed by a CPU in the printer.

A color-conversion-table creating method, a color-conversion-table creating device, a color-conversion-table creating program, a color conversion table, a color conversion device, and an image forming system according to an embodiment of the present invention will be described while referring to the accompanying drawings.

FIG. 1(a) is a block diagram showing the structure of a table creating device 10 according to the present embodiment. FIG. 1(b) is a block diagram showing the structure of a printer 40 connected to the table creating device 10.

As shown in FIG. 1(a), the table creating device 10 includes primarily a CPU 11 that performs overall control of the device: a ROM 13; a RAM 15; a hard disk drive 17; an input device 19 including a keyboard, mouse, or the like: a serial interface 21; a printer interface 23; a video interface 25; and a network interface 27. A calorimeter 30 is connected to the serial interface 21. The printer 40 is connected to the printer interface 23. A monitor 50 such as a liquid crystal display is connected to the video interface 25. External personal computers and the like are connected to the network interface 27.

In response to commands received from the CPU 11, the video interface 25 displays images on the monitor 50 based on RGB data. RGB data is image data represented in the RGB color space. In the RGB data, colors of each pixel are represented by a parameter R expressing the tone (gradation) of red, a parameter G expressing the tone of green, and a parameter B expressing the tone of blue.

The video interface 25 controls the monitor 50 to emit light in the three primary colors at a brightness corresponding to the tone values based on the parameters R, G, and B in the RGB data (hereinafter referred to as the RGB values). The monitor 50 receives a signal input from the video interface 25 and emits light at a brightness corresponding to the RGB values for each pixel in the RGB data to display the RGB image.

In response to commands received from the CPU 11, the printer interface 23 inputs RGB data together with a print command in the printer 40. When necessary, the printer interface 23 also inputs a command to store a color conversion table, a command to output a test patch, or the like in the printer 40. This will be described in greater detail below.

As shown in FIG. 1(b), the printer 40 connected to the printer interface 23 includes a CPU 41 that performs overall control of each section of the printer 40, a ROM 43, an EEPROM 44, a RAM 45, a printing unit 47 having the same structure as a laser printer well known in the art, and an interface 49 that can communicate with the table creating device 10 via the printer interface 23.

A first color conversion table 43a is stored in the ROM 43 as a default, while a second color conversion table 44a is stored in the EEPROM 44. The CPU 41 of the printer 40 executes a program also stored in the ROM 43 to convert RGB data received from the printer interface 23 into CMYK data based on either the first color conversion table 43a or the second color conversion table 44a. The CPU 41 inputs the CMYK data into the printing unit 47 and directs the printing unit 47 to print images on a recording paper based on the CMYK data.

Here, CMYK data indicates image data expressed in the CMYK color space. In the CMYK data, the color of each pixel is represented by a parameter C expressing the tone of cyan, a parameter M expressing the tone of magenta, a parameter Y expressing the tone of yellow, and a parameter K expressing the tone of black.

The color conversion tables 43a and 44a provide correspondence relationships (correlations) between each grid point in the RGB color space and each value of the parameters C, M, Y, and K in the CMYK color space (hereinafter referred to as the "CMYK values"). FIG. 2 shows the structure of the color conversion tables 43a and 44a. The color conversion tables 43a and 44a do not provide the CMYK values corresponding to all possible combinations of the parameters R, G, and B (that is, all colors that can be represented in the RGB color space), but only the CMYK values corresponding to specific grid points in the RGB color space.

Accordingly, in a color conversion/printing process, the CPU 41 of the printer 40 performs an interpolation process to convert RGB values for points other than the grid points into CMYK values in order to find CMYK values not given in the tables. FIG. 3 is a flowchart showing steps in the color conversion/printing process executed by the CPU 41. The CPU 41 executes the process when a print command is received from an external device via the printer interface 23.

At the beginning of the color conversion/printing process in S110, the CPU 41 selects a pixel for color conversion from the RGB data received along with the print command from the external device and acquires the RGB value of the pixel. In S120 the CPU 41 selects required grid points in the RGB color space for converting the RGB values of the target pixel to CMYK values. Here, the external device is not limited to the table creating device 10. For example, another personal computer may be connected to the interface 49 of the printer 40 from which the printer 40 acquires a print command and RGB data.

In S130 the CPU 41 determines whether the second color conversion table 44a is stored in the EEPROM 44. If the second color conversion table 44a is stored in the EEPROM 44 (S130: YES), then in S133 the CPU 41 reads CMYK values corresponding to the grid points selected in S120 from the second color conversion table 44a stored in the EEPROM 44. However, if the CPU 41 determines that the second color conversion table 44a is not stored in the EEPROM 44 (S130: NO), then in S137 the CPU 41 reads CMYK values corresponding to the grid points selected in S120 from the first color conversion table 43a stored in the ROM 43.

After completing the process in S133 or S137, in S140 the CPU 41 uses an interpolation method well known in the art to calculate CMYK values corresponding to the RGB values of the target pixel, based on the CMYK values read for the grid point. In S150 the CPU 41 stores the CMYK values calculated in S140 at a position in a CMYK data creation area of the RAM 45 corresponding to the selected pixel. In S160 the CPU 41 determines whether the process described above (S110-S150) has been performed for all pixels.

If the CPU 41 determines that the process described above has not been completed for all pixels (S160: NO), then the CPU 41 returns to S110, selects the next pixel, and repeats the process to convert RGB values for the selected pixel into CMYK values.

However, if the CPU 41 determines that the process described above has been completed for all pixels and all CMYK data has been generated (S160: YES), then in S170 the CPU 41 directs the printing unit 47 to print an image on recording paper based on the CMYK data stored in the CMYK data creation area of the RAM 45. At this point, the color conversion/printing process ends.

Figure 4:
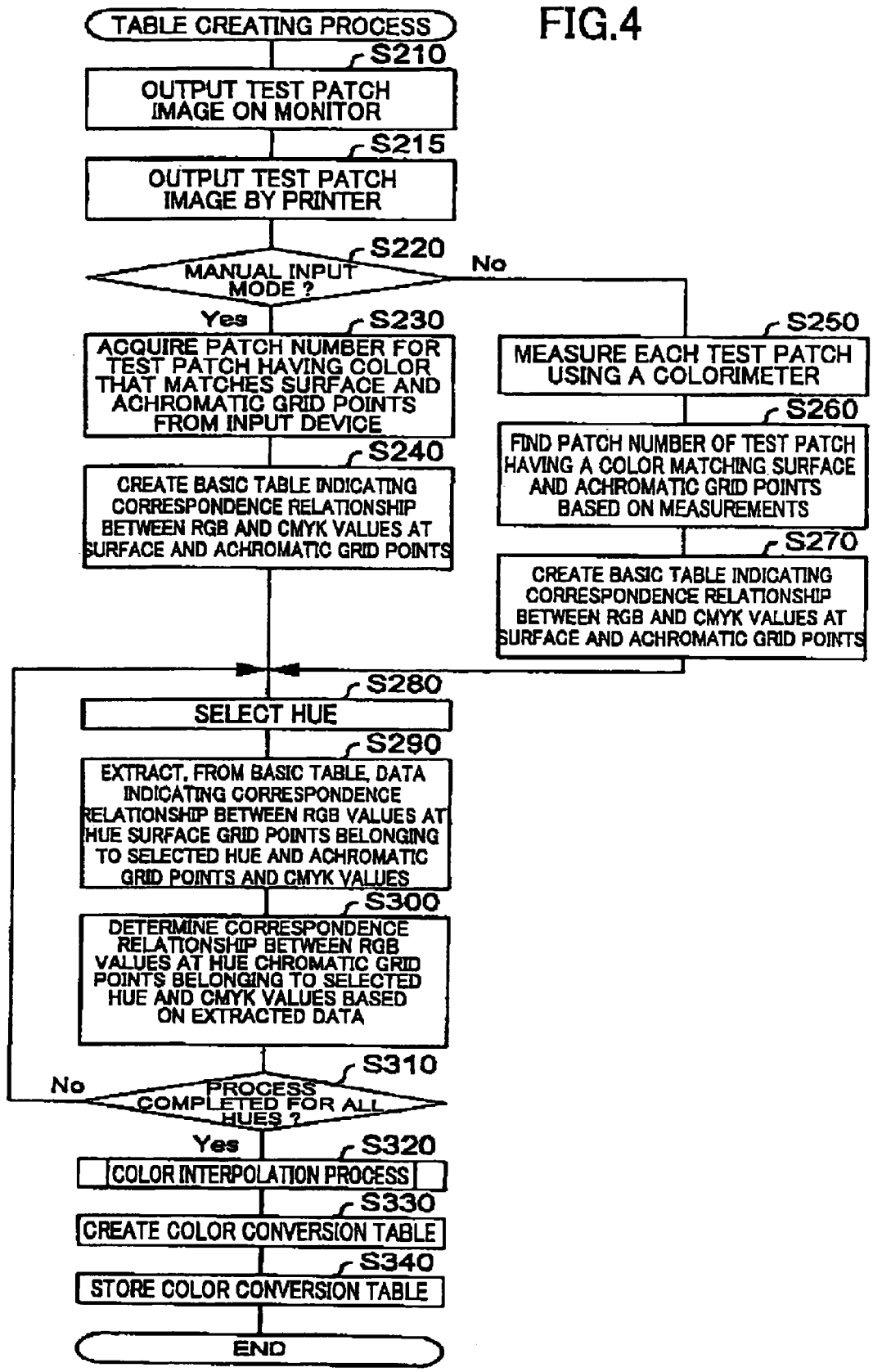
FIG. 4 is a flowchart showing steps in a color-conversion-table creating process executed by a CPU in the table creating device.

The second color conversion table 44a is created when the CPU 11 of the table creating device 10 executes a table creating program 17a stored in the hard disk drive 17. FIG. 4 is a flowchart showing steps in the table creating process implemented by the CPU 11 executing the table creating program 17a. The CPU 11 executes the table creating process of FIG. 4 upon receiving a table creating command from the input device 19.

At the beginning of the table creating process in S210, the CPU 11 outputs a test patch image PT1 to the monitor 50. In the present embodiment, test data for displaying the test patch image PT1 on the monitor 50 is stored in the hard disk drive 17. In S210 the CPU 11 reads this test data from the hard disk drive 17 and inputs the data into the video interface 25, causing the monitor 50 to display the test patch image PT1.

Figure 6:
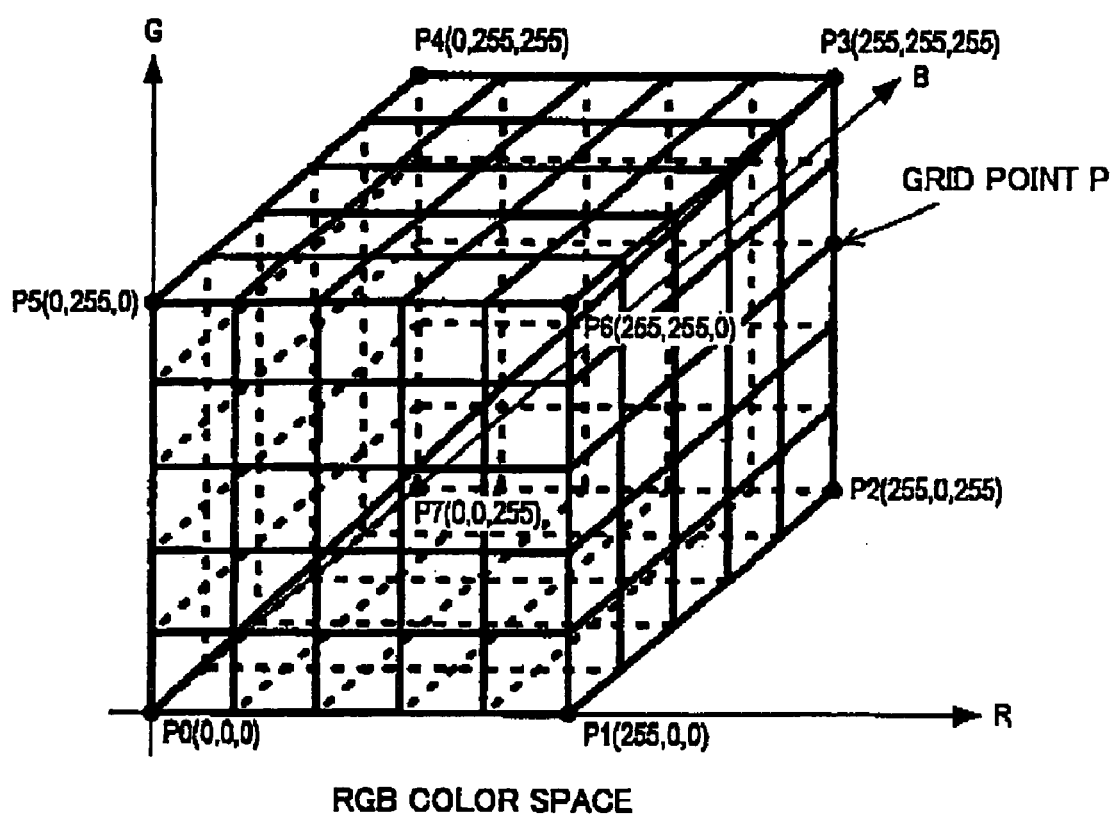
FIG. 6 is an explanatory diagram showing an RGB color space.

As shown in FIG. 6, a color gamut is defined in the RGB color space used for the monitor 50. In an example of FIG. 6, the color gamut has a substantially cube shape. The color gamut has a surface (that is, six faces of the cube) and an internal space surrounded by the surface. An achromatic axis is defined in the internal space and connects grid points P0 and P3. Surface grid points are defined as grid points positioned on the surface, including grid points positioned at the vertices (P0, P1, P2, P3, P4, P5, P6, and P7) and grid points positioned at the edges of the cube. Achromatic grid points are defined as grid points positioned on the achromatic axis, excluding the grid points P0 and P3. Chromatic grid points are defined as grid points positioned in the internal space and shifted from the achromatic axis. In other words, the chromatic grid points are grid points other than the surface grid points and the achromatic grid points.

Figure 5A:
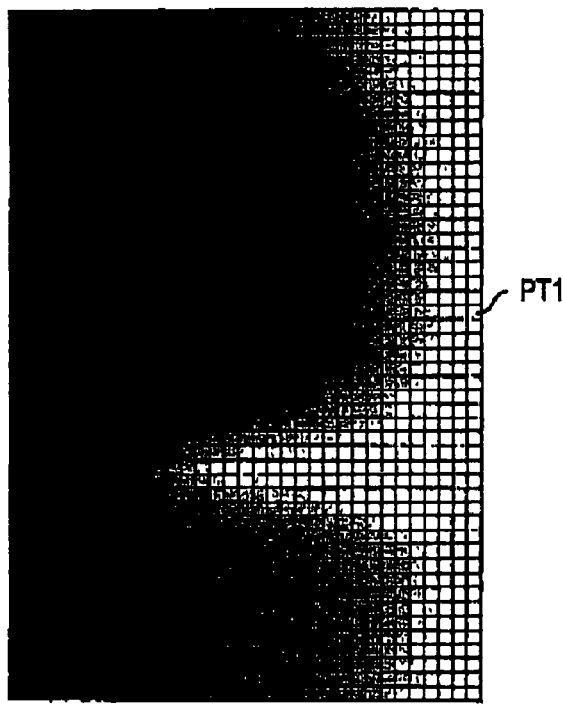
FIG. 5(a) is an explanatory diagram showing an example of a test patch image.

The test patch image PT1 displayed on the monitor 50 is configured of a group of test patches formed in RGB values corresponding to the surface grid points and the achromatic grid points. FIG. 5(a) shows an example of such a test patch image PT1. Patch numbers are assigned to each test patch in the test patch image PT1.

In S215 the CPU 11 inputs a command to output a test patch to the printer 40 via the printer interface 23, directing the printer 40 to print a test patch image PT2 on recording paper. Specifically, when the CPU 41 of the printer 40 receives a command to output a test patch from the printer interface 23, the CPU 41 inputs test data represented in the CMYK color space that is stored in the ROM 43 into the printing unit 47, directing the printing unit 47 to form the test patch image PT2 on recording paper.

Figure 5B:
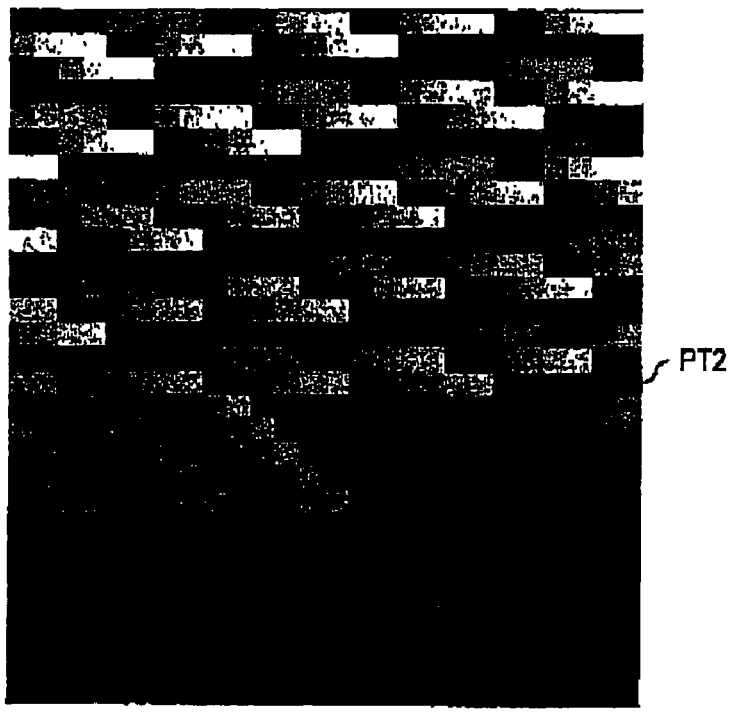
FIG. 5(b) is an explanatory diagram showing an example of another test patch image.

As shown in FIG. 5(b), the test patch image PT2 formed on the recording paper in S215 is configured of a plurality of test patches. Patch numbers are assigned to each test patch. The CMYK test data used for outputting the test patch image PT2 is also stored on the hard disk drive 17 on the table creating device 10 in order to determine correspondence relationships between each test patch of the test patch image PT2 and CMYK values used for outputting the test patch.

The test patch image PT2 used in the present embodiment is a standard color chart defined by ANSI IT8. However, a test patch image having more meticulous sampling in the color gamut than that defined in ANSI IT8 may be used in order to reduce differences between the test patch image PT1 and test patch image PT2.

After the CPU 11 has outputted the test patch image PT1 to the monitor 50 and formed the test patch image PT2 by the printer 40 in this way, in S220 the CPU 11 determines whether the table creating command received from the input device 19 specifies a manual input mode. If the manual input mode has been specified (S220: YES), then in S230 the CPU 11 prompts the user to input information (patch numbers) for CMYK values corresponding to the surface grid points in the RGB color space and for CMYK values corresponding to the achromatic grid points in the RGB color space using the input device 19.

Here, the user is prompted to select by eye a test patch (PT2) having a color nearest that of the test patch (PT1) displayed on the monitor 50 from among the test patch image PT2 printed out by the printer 40 and to input the patch number of the test patch (PT2) using the input device 19. The user is prompted to perform the input by outputting a message on the monitor 50. Here, "test patch (PT1)" indicates the test patch outputted on the monitor 50, while "test patch (PT2)" indicates the test patch outputted by the printer 40 on a recording paper.

In S240 the CPU 11 determines the CMYK values corresponding to the patch number inputted via the input device 19 based on the test data stored in the hard disk drive 17 to obtain a correspondence relationship between the RGB values at the surface grid points and achromatic grid points and CMYK values, Next, the CPU 11 creates a basic table providing correspondence relationships between each of the surface grid points in the RGB color space and each parameter in the CMYK color space (in other words, the CMYK values) and correspondence relationships between each of the achromatic grid points in the RGB color space and each parameter in the CMYK color space. The CPU 11 stores the basic table in the RAM 15.

FIG. 6 is an explanatory diagram showing the structure of the RGB color space. FIG. 7 is an explanatory diagram showing the structure of the basic table. FIGS. 6 and 7 illustrate an example in which the RGB parameters are each represented by eight bits.

As shown in FIG. 7, the basic table is configured of (a) data representing correspondence relationships between CMYK values and RGB values at each of the surface grid points of FIG. 6; and (b) data representing correspondence relationships between CMYK values and RGB values at each of the achromatic grid points.

If the CPU 11 determines in S220 that the table creating command received from the input device 19 does not specify the manual input mode (S220: NO), then in S250 the CPU 11 measures the calorimetric values of each test patch using the calorimeter 30. The calorimeter 30 is a device well known in the art for expressing colors of a test patch in the parameters (L*, a*, b*) of a device-independent color space (such as the L*a*b* color space) and outputting the measured values (L*a*b* values).

In S250 the CPU 11 acquires measured values for each test patch in the test patch image PT1 displayed on the monitor 50 from the calorimeter 30 and stores the L*a*b* values in the RAM 15 in association with the patch numbers for each test patch. In addition, the CPU 11 acquires L*a*b* values for each test patch in the test patch image PT2 printed by the printer 40 from the colorimeter 30 and stores these L*a*b* values in the RAM 15 in association with the patch numbers for these test patches.

It is also possible to use the colorimeter 30 in S250 only for measuring test patches in the test patch image PT2 printed by the printer 40. In this case, the CPU 11 stores, in the RAM 15, L*a*b* values corresponding to the RGB values of test patches (PT1) displayed on the monitor 50. The L*a*b* values are obtained based on the L*a*b* values defined in the monitor profile (SRGB, for example). In addition, the CPU 11 acquires the measured L*a*b* values for each test patch (PT2) printed by the printer 40 from the calorimeter 30 and stores the measured L*a*b* values in the RAM 15 in association with the patch numbers for the test patches.

In S260 the CPU 11 references the measured results to find the patch number of the test patch on the printer 40 end (PT2) whose measured L*a*b* values have the least difference between a test patch in the test patch image PT1 outputted on the monitor 50. In other words, the CPU 11 finds the patch number of the test patch image PT2 whose measured L*a*b* values match a test patch in the test patch image PT1 outputted on the monitor 50.

In S270 the CPU 11 determines correspondence relationships between patch numbers and CMYK values from the test data stared in the hard disk drive 17 and creates a basic table indicative of correspondence relationships between each of the surface grid points in the RGB color space and each parameter in the CMYK color space (CMYK values) and correspondence relationships between each of the achromatic grid points in the RGB color space and each parameter in the CMYK color space. The basic table has the same structure as that shown in FIG. 7.

After completing the process in S240 or S270, in S280 the CPU 11 selects one of predetermined hues (color components). In S290 the CPU 11 extracts, from the basic table created in S240 or S270, data expressing correspondence relationships between each surface grid point that belongs to the selected hue (hue surface grid point) and each parameter in the CMYK color space, and correspondence relationships between each achromatic grid point and each parameter in the CMYK color space (that is, data indicating correspondence relationships between the RGB color space and CMYK color space with respect to the selected hue).

For example, if there are a total of six predetermined hues including red (R), magenta (M), blue (B), cyan (C), green (G), and yellow (Y) and the selected hue is red, then the data indicating an RGB-CMYK correspondence relationship for the red hue extracted from the basic table will be data indicating a correspondence relationship between the CMYK values and RGB values for each grid point positioned on each side of a triangle P0P1P3 shown in FIG. 6 that has the vertices P0, P1, and P3.

Further, the CPU 11 will extract data indicating correspondence relationships between CMYK values and RGB values at grid points positioned on each side of a triangle P0P2P3 having the vertices P0, P2, and P3 as the RGB-CMYK correspondence relationship for the magenta hue. The CPU 11 will extract data indicating correspondence relationships between CMYK values and RGB values at grid points positioned on each side of a triangle P0P7P3 having the vertices P0, P7, and P3 as the RGB-CMYK correspondence relationship for the blue hue.

Further, the CPU 11 will extract data indicating correspondence relationships between CMYK values and RGB values at grid points positioned on each side of a triangle P0P4P3 having the vertices P0, P4, and P3 as the RGB-CMYK correspondence relationship for the cyan hue. The CPU 11 will extract data indicating correspondence relationships between CMYK values and RGB values at grid points positioned on each side of a triangle P0P5P3 having the vertices P0, P5, and P3 as the RGB-CMYK correspondence relationship for the green hue.

Further, the CPU 11 will extract data indicating correspondence relationships between CMYK values and RGB values at grid points positioned on each side of a triangle P0P6P3 having the vertices P0, P6, and P3 as the RGB-CMYK correspondence relationship for the yellow hue.

Figure 8A:
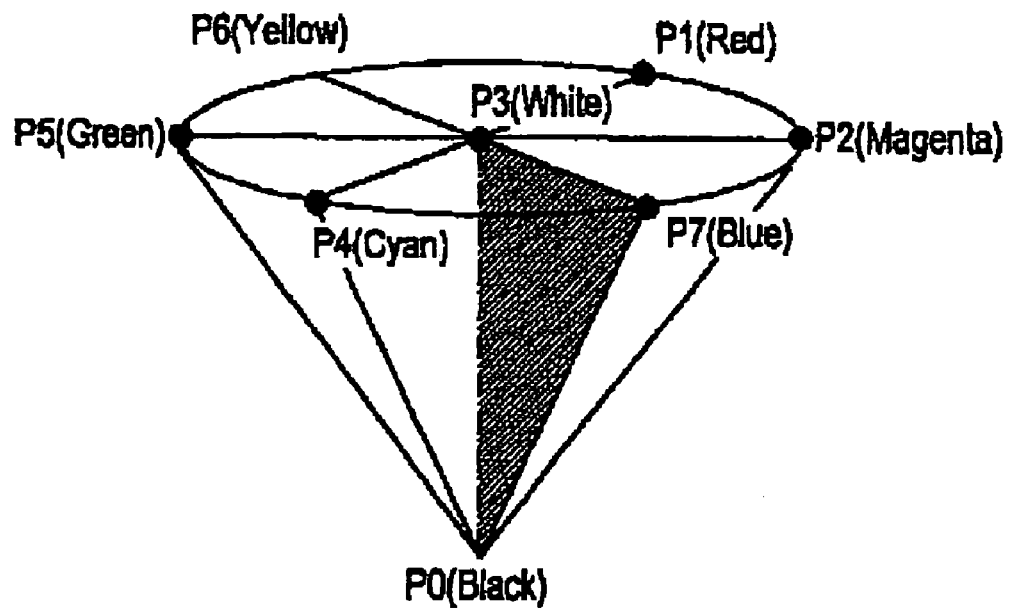
FIG. 8(a) is an explanatory diagram showing the RGB color space in a conic space.
Figure 8B:
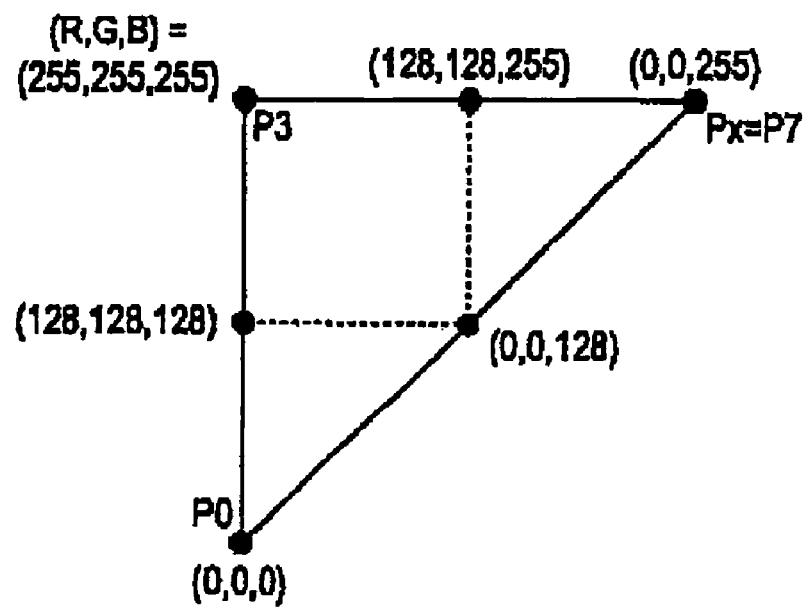
FIG. 8(b) is an explanatory diagram showing grid points in the RGB color space that belong to a blue hue.

FIG. 8(a) represents the RGB color space of FIG. 6 in a conic space. FIG. 8(b) is an explanatory diagram showing the surface grid points and achromatic grid points in the RGB color space belonging to the blue hue. The surface grid points that belong to the blue hue are positioned on the edge connecting grid points P0 and P7 and the edge connecting grid points P7 and P3, while the achromatic grid points are positioned on the achromatic axis connecting grid points P3 and P0.

Figure 9:
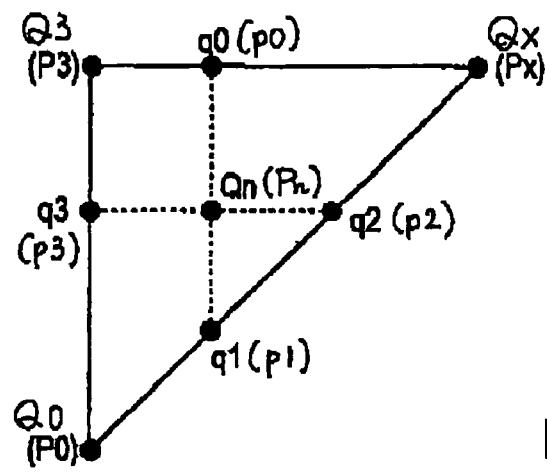
FIG. 9 is an explanatory diagram illustrating a method of determining CMYK values corresponding to grid points belonging to a predetermined hue within a color gamut of the RGB color space.

After extracting data showing correspondence relationships between the RGB and CMYK color spaces for the selected hue from the basic table in S290, in S300 the CPU 11 determines correspondence relationships between chromatic grid points that belong to the hue selected in S280 and parameters in the CMYK color space based on the data extracted from the basic table and using the method shown in FIG. 9. FIG. 9 is an explanatory diagram showing a method for determining CMYK values for a point Qn in the CMYK color space corresponding to a hue chromatic grid point Pn that belongs to the predetermined hue. Here, hue chromatic grid points are defined as chromatic grid points that belong to the predetermined hues.

For example, when determining CMYK values (Cn, Mn, Yn, Kn) for a point Qn in the CMYK color space corresponding to a grid point Pn having RGB values (Rn, Gn, Bn) in the example of FIG. 9, we consider a triangle P0P3Px having vertices P0, P3, and Px (where Px is a grid point representing a primary color of the selected hue and the grid point Px is one of P1, P2, P4, P5, P6, and P7) CMYK values for the points Qn are calculated only for grid points Pn positioned on the triangle P0P3Px (hue chromatic grid points Pn belonging to the selected hue) using linear interpolation. Next, an example of the calculation using linear interpolation will be described.

The CPU 11 uses the following CMYK values in the triangle P0P3Px to calculate the CMYK values (Cn, Mn, Yn, Kn) of the point Qn in the CMYK color space: CMYK values (C0, M0, Y0, K0) for a point q0 in the CMYK color space corresponding to an intersecting point p0 between the edge PxP3 and a line parallel to the edge P3P0 that passes through the grid point Pn; CMYK values (C1, M1, Y1, K1) for a point q1 in the CMYK color space corresponding to an intersecting point p1 between the edge PxP0 and a line parallel to the edge P3P0 that passes through the grid point Pn: CMYK values (C2, M2, Y2, K2) for a point q2 in the CMYK color space corresponding to an intersecting point p2 between the edge PxP0 and a line parallel to the edge P3Px that passes through the grid point Pn: and CMYK values (C3, M3, Y3, K3) for a point q3 in the CMYK color space corresponding to an intersecting point p3 between the edge P3P0 and a line parallel to the edge P3Px that passes through the grid point Pn.

The CPU 11 then calculates the CMYK values (Cn, Mn, Yn, Kn) for the point Qn in the CMYK color space as shown below using the above-mentioned CMYK values. In the following equations, the distance between points Qa and Qb in the CMYK color space is expressed by D[Qa, Qb].

$$Cn = (D[q0, Qn] \cdot C1 + D[q1, Qn] \cdot C0 + D[q2, Qn] \cdot C3 + D[q3, Qn] \cdot C2)/Sn \tag{1}$$

$$Mn = (D[q0, Qn] \cdot M1 + D[q1, Qn] \cdot M0 + D[q2, Qn] \cdot M3 + D[q3, Qn] \cdot M2)/Sn \tag{2}$$

$$Yn = (D[q0, Qn] \cdot Y1 + D[q1, Qn] \cdot Y0 + D[q2, Qn] \cdot Y3 + D[q3, Qn] \cdot Y2)/Sn \tag{3}$$

$$Kn = (D[q0, Qn] \cdot K1 + D[q1, Qn] \cdot K0 + D[q2, Qn] \cdot K3 + D[q3, Qn] \cdot K2)/Sn \tag{4}$$

$$Sn = D[q0, Qn] + D[q1, Qn] + D[q2, Qn] + D[q3, Qn] \tag{5}$$

After calculating the CMYK values for all grid points Pn positioned within the triangle P0P3Px using the above-described method, the CPU 11 obtains correspondence relationships between hue chromatic grid points belonging to the hue selected in S280 and parameters in the CMYK color space. The calculated CMYK values are stored in the RAM 15.

After obtaining correspondence relationships between the hue chromatic grid points and the CMYK values, the CPU 11 determines in S310 whether the process of S300 described above has been performed for all hues.

If the process of S300 has not been completed for all hues (S310: NO), then the CPU 11 returns to S280 and selects the next hue. However, if the process of S300 has been completed for all hues (S310: YES), then in S320 the CPU 11 performs a color interpolation process to find CMYK values corresponding to the remaining grid points in the RGB color space.

Figure 10:
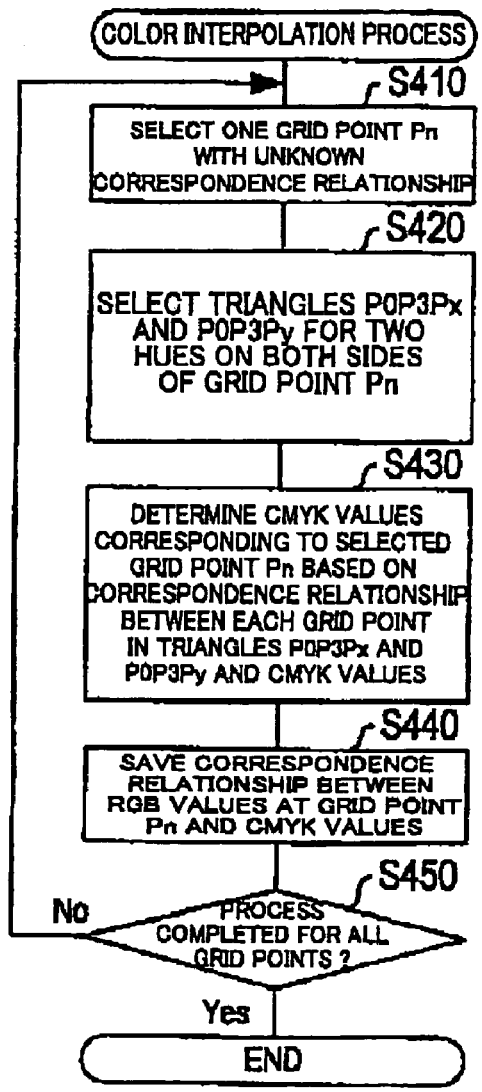
FIG. 10 is a flowchart illustrating steps in a color interpolation process executed by the CPU in the table creating device.
Figure 11:
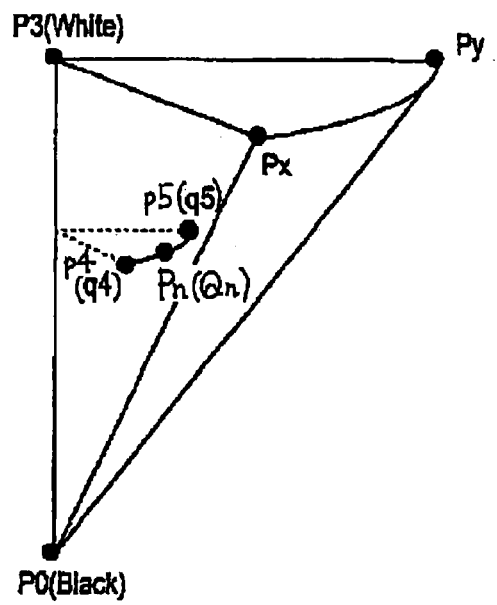
FIG. 11 is an explanatory diagram showing a method of determining CMYK values corresponding to a grid point Pn positioned between two hues in the RGB color space.

FIG. 10 is a flowchart showing steps in the color interpolation process executed by the CPU 11. FIG. 11 is an explanatory diagram illustrating a method of determining CMYK values for a grid point Qn in the CMYK color space corresponding to a grid point Pn in the RGB color space that is positioned between two hues (in-between chromatic grid points). The in-between chromatic grid points are defined as chromatic grid points positioned between any two of the predetermined hues.

At the beginning of the color interpolation process in S410 of FIG. 10, the CPU 11 selects one grid point Pn for which a correspondence relationship with CMYK values is not yet known (in other words, one in-between chromatic grid point Pn). In S420 the CPU 11 selects triangles P0P3Px and P0P3Py for two hues on both sides of the grid point Pn in the conic space shown in FIG. 8(a), and determines a first hue chromatic grid point p4 and a second hue chromatic grid point p5 between which the selected in-between chromatic grid point Pn is positioned. The first hue chromatic grid point p4 is positioned on the triangle P0P3Px, and the second hue chromatic grid point p5 is positioned on the triangle P0P3Py.

In S430 the CPU 11 calculates CMYK values for a point Qn in the CMYK color space corresponding to the selected grid point Pn based both on a correspondence relationship between CMYK values and the first hue chromatic grid point p4 and on a correspondence relationship between CMYK values and the second hue chromatic grid point p5, both determined in S300. In the present embodiment, the CPU 11 calculates CMYK values for the grid point Pn enclosed by the two triangles using one of the combinations (Px, Py)=(P1, P2), (P2, P7), (P7, P4), (P4, P5), (P5, P6), and (P6, P1).

More specifically, the CPU 11 uses the following CMYK values for calculating CMYK values (Cn, Mn, Yn, Kn) of the point Qn in the CMYK color space corresponding to the selected grid point Pn: CMYK values (C4, M4, Y4, K4) for a point q4 in the CMYK color space corresponding to the first hue chromatic grid point p4 which is an intersection between a line parallel to the side PxPy that passes through the grid point Pn and the triangle P0P3Px; and CMYK values (C5, M5, Y5, K5) at a point q5 in the CMYK color space corresponding to the second hue chromatic grid point p5 which is an intersection between a line parallel to the side PxPy passing through the grid point Pn and the triangle P0P3Py.

Using these CMYK values, the CPU 11 calculates the CMYK values (Cn, Mn, Yn, Kn) at the point Qn in the CMYK color space as follows.

$$Cn = (D\ [q5,\ Qn] \cdot C4 + D\ [q4,\ Qn] \cdot C5)/Tn \quad (6)$$

$$Mn = (D\ [q5,\ Qn] \cdot M4 + D\ [q4,\ Qn] \cdot M5)/Tn \quad (7)$$

$$Yn = (D\ [q5,\ Qn] \cdot Y4 + D\ [q4,\ Qn] \cdot Y5)/Tn \quad (8)$$

$$Kn = (D\ [q5,\ Qn] \cdot K4 + D\ [q4,\ Qn] \cdot K5)/Tn \quad (9)$$

$$Tn = D\ [q4,\ Qn] + D\ [q5,\ Qn] \quad (10)$$

After calculating CMYK values corresponding to all grid points Pn in the color gamut that are positioned between the hues (in-between chromatic grid points) according to the method described above, in S440 the CPU 11 saves the CMYK values in the RAM 15 in association with RGB values for the corresponding grid points Pn.

In S450 the CPU 11 determines whether correspondence relationships between grid points Pn and CMYK values have been determined for all grid points Pn in the RGB color space. If there still exists a grid point Pn for which a correspondence relationship is still unknown (S450: NO), then the CPU 11 returns to S410 and selects another grid point Pn whose correspondence relationship has not yet been determined and repeats the processes in S420-S440 described above. However, if the CPU 11 determines that correspondence relationships between grid points Pn and CMYK values have been determined for all grid points Pn in the RGB color space (S450: YES), then the color interpolation process ends.

After completing the color interpolation process, the CPU 11 writes the RGB values for the surface grid points provided in the basic table and the CMYK values corresponding to these grid points in the color conversion table creating area of the RAM 15. The CPU 11 also writes the RGB values for the achromatic grid points and their corresponding CMYK values in the color conversion table creating area of the RAM 15. The CPU 11 also writes RGB values for the hue chromatic grid points for each hue determined in S300 and their corresponding CMYK values in the color conversion table creating area of the RAM 15. In S330, by writing the RGB values of the in-between chromatic grid points determined in S320 and their corresponding CMYK values in the color conversion table creating area of the RAM 15, the CPU 11 completes a color conversion table that provides correspondence relationships between RGB values of each grid point in the RGB color space and CMYK values corresponding to these grid points.

After completing the creation of the color conversion table, in S340 the CPU 11 inputs a command in the printer 40 via the printer interface 23 for storing the color conversion table. The CPU 11 also inputs the color conversion table created in S330 to the printer 40, and the table is stored in the EEPROM 44 of the printer 40.

Upon receiving a command to store a color conversion table from the CPU 11 via the printer interface 23 and interface 49, the CPU 41 in the printer 40 writes, in the EEPROM 44, the color conversion table received together with the command as the second color conversion table 44a. After completing the process in S340, the CPU 11 ends the table creating process.

Figure 12:
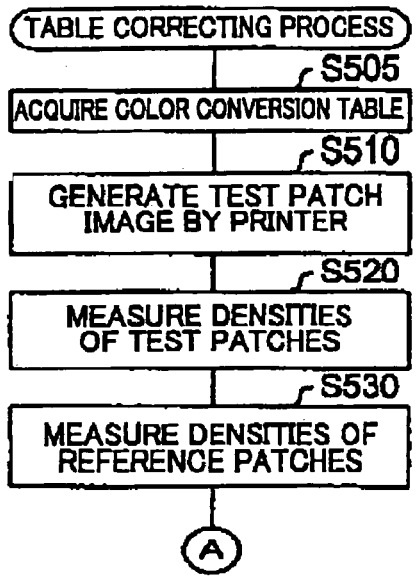
FIG. 12 is a flowchart illustrating steps in a table correcting process executed by the CPU of the table creating device.
Figure 12:
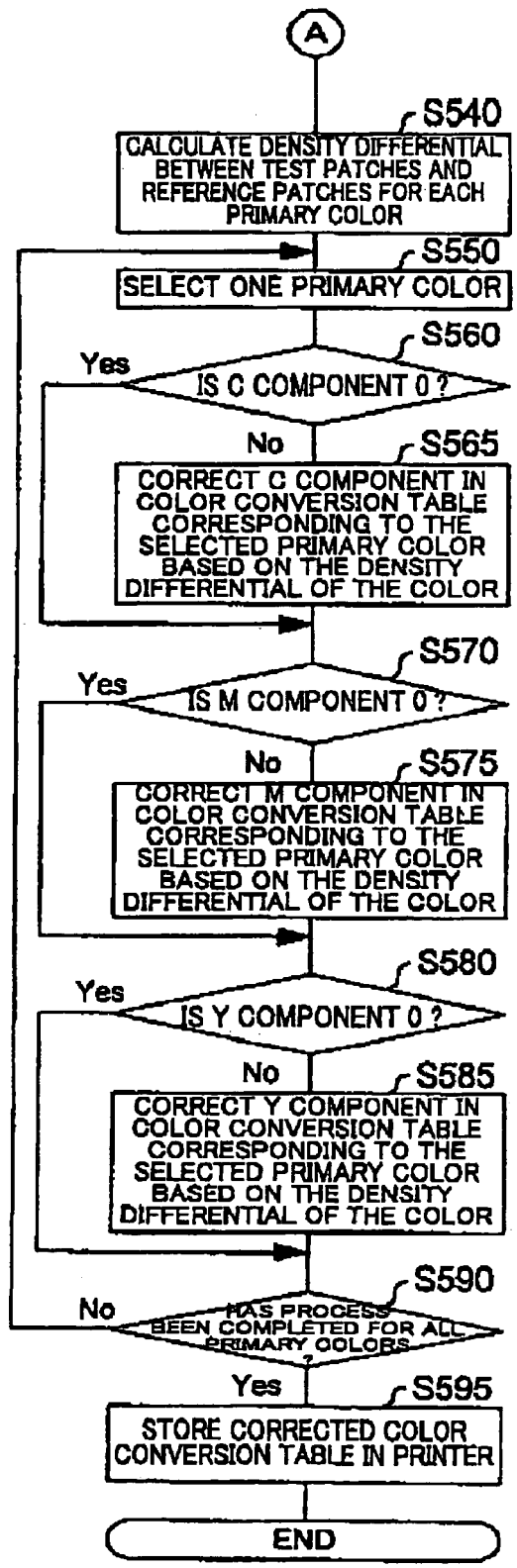

FIG. 12 is a flowchart showing steps in a table correcting process (table calibrating process) executed by the CPU 11 when a table correcting command is inputted from the input device 19. The table correcting process shown in FIG. 12 appropriately corrects the color conversion table generated in the table creating process described above and stored in the printer 40.

At the beginning of the table correcting process in S505, the CPU 11 acquires the second color conversion table 44a from the printer 40 via the printer interface 23 and stores the table in the RAM 15. In S510 the CPU 11 inputs the test data for the RGB color space stored in the hard disk drive 17 to the printer 40 together with a print command. The printer 40 is directed to perform color conversion on the test data based on the second color conversion table 44a stored in the EEPROM 44 and to print a test patch image on recording paper based on the converted test data.

In S520 the CPU 11 controls the calorimeter 30 to measure the density in a test patch included in the test patch image that represents a primary color (that is, a test patch created using CMYK values converted according to the second color conversion table 44a from RGB values for the grid points P1, P2, P4, P5, P6, and P7 in the RGB color space) and acquires density values for test patches of each primary color. The calorimeter 30 of the present embodiment is capable of measuring density as well as color values (L*a*b* values).

In S530 the CPU 11 controls the colorimeter 30 to measure densities in a reference patch for each primary color from a reference paper that has been printed with patches in primary colors used as a reference in correction (hereinafter referred to as "reference patches") and acquires density values for the reference patches of each primary color.

In S540 the CPU 11 compares the density value of the reference patches with the density values of the test patches in the test patch image for each primary color and calculates a density differential $\delta$. After calculating the density differential $\delta$, in S550 the CPU 11 selects one of the primary colors (there ate six in the present embodiment: red, green, blue, cyan, magenta, and yellow). In S560 the CPU 11 determines whether the tone value of the parameter C in the CMYK values used for forming the test patch that corresponds with the selected primary color is zero.

If the CPU 11 determines that the tone of parameter C is not zero (S560: NO), then in S565 the CPU 11 adds a value $\alpha\cdot\delta$ to a value Cx, and changes the value of the parameter C corresponding to the grid point Px to the result of the addition (Cx+$\alpha\cdot\delta$). Here, the value $\alpha\cdot\delta$ is obtained by multiplying the density differential $\delta$ by a constant $\alpha$. The value Cx is a parameter C corresponding to a grid point Px of the primary color provided in the color conversion table in the RAM 15. The CPU 11 changes the value Cn to Cn+$\alpha\cdot\delta$ for the parameter C corresponding to each grid point Pn positioned on the line connecting grid points Px and P3 and on the line connecting grid points Px and P0 (that is, each grid point positioned on the surface and belonging to the same hue as the primary color). Here, surface grid points belonging to the predetermined hues are referred to as "hue surface grid points". After completing the process of S565, the CPU 11 advances to S570. Alternatively, if the tone of the parameter C is determined to be zero (S560: YES), then the CPU 11 skips S565 and advances directly to S570.

In S570 the CPU 11 determines whether the tone value of the parameter M in the CMYK values used for forming the test patch that corresponds with the selected primary color is zero. If the CPU 11 determines that the tone of parameter M is not zero (S570: NO), then in S575 the CPU 11 adds a value $\beta\cdot\delta$ obtained by multiplying the density differential $\delta$ by a constant $\beta$ to a value Mx of the parameter M corresponding to a grid point Px of the primary color provided in the color conversion table in the RAM 15, and changes the value of the parameter M corresponding to the grid point Px to the result of the addition (Mx+$\beta\cdot\delta$). The CPU 11 changes the value Mn to Mn+$\beta\cdot\delta$ for the parameter M corresponding to each grid point Pn positioned on the line connecting grid points Px and P3 and on the line connecting grid points Px and P0 (that is, each hue surface grid point belonging to the same hue as the primary color). After completing the process of S575, the CPU 11 advances to S580. Alternatively, if the tone of the parameter M is determined to be zero (S570: YES), then the CPU 11 skips S575 and advances directly to S580.

In S580 the CPU 11 determines whether the tone value of the parameter Y in the CMYK values used for forming the test patch that corresponds with the selected primary color is zero. If the CPU 11 determines that the tone of parameter Y is not zero (S580: NO), then in S585 the CPU 11 adds a value $\gamma\cdot\delta$ obtained by multiplying the density differential $\delta$ by a constant $\gamma$ to a value Yx of the parameter Y corresponding to a grid point Px of the primary color provided in the color conversion table in the RAM 15, and changes the value of the parameter $\gamma$ corresponding to the grid point Px to the result of the addition (Yx+$\gamma\cdot\delta$). The CPU 11 changes the value Yn to Yn+$\gamma\cdot\delta$ for the parameter Y corresponding to each grid point Pn positioned on the line connecting grid points Px and P3 and on the line connecting grid points Px and P0 (that is, each hue surface grid point belonging to the same hue as the primary color). After completing the process of S585, the CPU 11 advances to S590. Alternatively, if the tone of the parameter Y is determined to be zero (S580: YES), then the CPU 11 skips S585 and advances directly to S590.

In S590 the CPU 11 determines whether the processes of S560-S585 have been performed for all primary colors. If the CPU 11 determines that these processes have not been performed for all primary colors (S590: NO), then the CPU 11 returns to S550 and selects the next primary color. However, if the CPU 11 determines that the processes have been performed for all primary colors (S590: YES), then in S595 the CPU 11 inputs, to the printer 40, the corrected color conversion table in the RAM 15 together with a command for storing the color conversion table, instructing the printer 40 to store the corrected color conversion table in the EEPROM 44 in place of the color conversion table that was stored prior to correction. Subsequently, the CPU 11 ends the table correcting process.

In the description of the present embodiment for the structure of the table creating device 10 and the structure of the printer 40, the table creating device 10 determines CMYK values corresponding to surface grid points (S240 or S270) and, through linear interpolation, determines the CMYK values for grid points other than the surface grid points based on the determination (S280-S320). Hence, there is no occurrence of tone irregularities (reversed tones or the like) that can occur when converting RGB data to CMYK data via a device-independent color space. Since there is no need in the present embodiment to convert colors between the RGB color space and the device-independent color space or between the device-independent color space and the CMYK color space, there is less processing load and it is possible to create a color conversion table that facilitates suitable color conversion.

Further, in S240 or S270 the table creating device 10 establishes correspondence relationships with the CMYK color space not only for the surface grid points, but also for the achromatic grid points. Accordingly, it is possible to prevent errors in determining such correspondence relationships from having a great effect when determining correspondence relationships between other grid points (chromatic grid points) and the CMYK data (that is, when executing processes in S300 and S320).

The table creating device 10 is also configured to measure images outputted on the monitor 50 and by the printing unit 47 using the calorimeter 30 and to create a basic table based on the measurements (S250-S270). Hence, the user is not required to select a test patch that matches a color, thereby not inconveniencing the user when creating the basic table.

The table creating device 10 can also prompt the user to select a test patch that matches a color, acquire the selection from the input device 19 (S230), and create a basic table based on the acquired data (S240). Hence, the table creating device 10 can easily create a color conversion table adapting to human sensibilities.

The table creating device 10 also extracts correspondence relationships for each hue from the basic table and finds correspondence relationships between each hue chromatic grid point belonging to each hue and CMYK values based on the correspondence relationships in the basic table (S300). Hence, color deviations do not occur between the original color and the converted color when converting from the RGB color space to the CMYK color space.

After determining correspondence relationships for each hue, the table creating device 10 according to the present embodiment executes the color interpolation process (S320) and determines CMYK values for the remaining grid points in the RGB color space (in-between chromatic grid points) through linear interpolation. Hence, using the color conversion table created earlier, the table creating device 10 can output from the printer 40 an image corresponding to inputted RGB data, without the user sensing color or hue differences.

Hence, with a low processing load, the table creating device 10 facilitates creation of a color conversion table for outputting satisfactory images from the printer 40 with regard to images outputted on the monitor 50. The table creating device 10 can produce more satisfactory output on the printer 40 using reference data to correct the color conversion table to produce suitable densities in the primary colors.

While the invention has been described in detail with reference to the specific embodiment thereof, it would be apparent to those skilled in the art that various changes and modifications may be made therein without departing from the spirit of the invention.

For example, in the above-described embodiment, only a single color conversion table created by the table creating device 10 is stored on the printer 40. However, by storing a plurality of color conversion tables created by the table creating device 10 on the printer 40, color conversion can be performed using a table appropriate for the printing mode or type of recording paper being printed on.

However, if a plurality of color conversion tables is stored in the EEPROM 44 or other memory, a large capacity memory must be incorporated in the printer 40, increasing the manufacturing cost of the printer 40. Hence, if the printer 40 is configured to use different color conversion tables depending on the printing mode (normal mode, photo mode, and the like) or depending on the type of paper, then a basic table can be stored in the memory of the printer 40 in place of a color conversion table and a color conversion table can be created from the basic table when needed on the printer 40 end.

Next, a table creating device 10' and a printer 40' according to a modification will be described while referring to FIGS. 13 to 16, wherein like parts and components are designated by the same reference numerals to avoid duplicating description.

Figure 13:
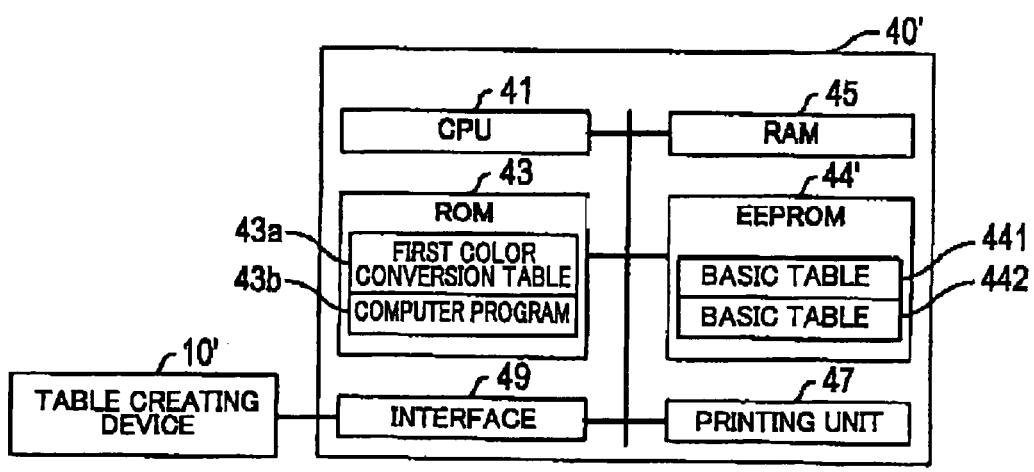
FIG. 13 is a block diagram showing a printer according to a modification.

The table creating device 10' according to the modification differs from the table creating device 10 described above primarily in the configuration of the table creating process. As shown in FIG. 13, the printer 40' of the modification differs from the printer 40 primarily in the type of data stored in a EEPROM 44' and the configuration of the color conversion/printing process. Hence, in the following description of the table creating device 10' and printer 40', parts and configurations similar to the table creating device 10 and printer 40 are not included.

Figure 14:
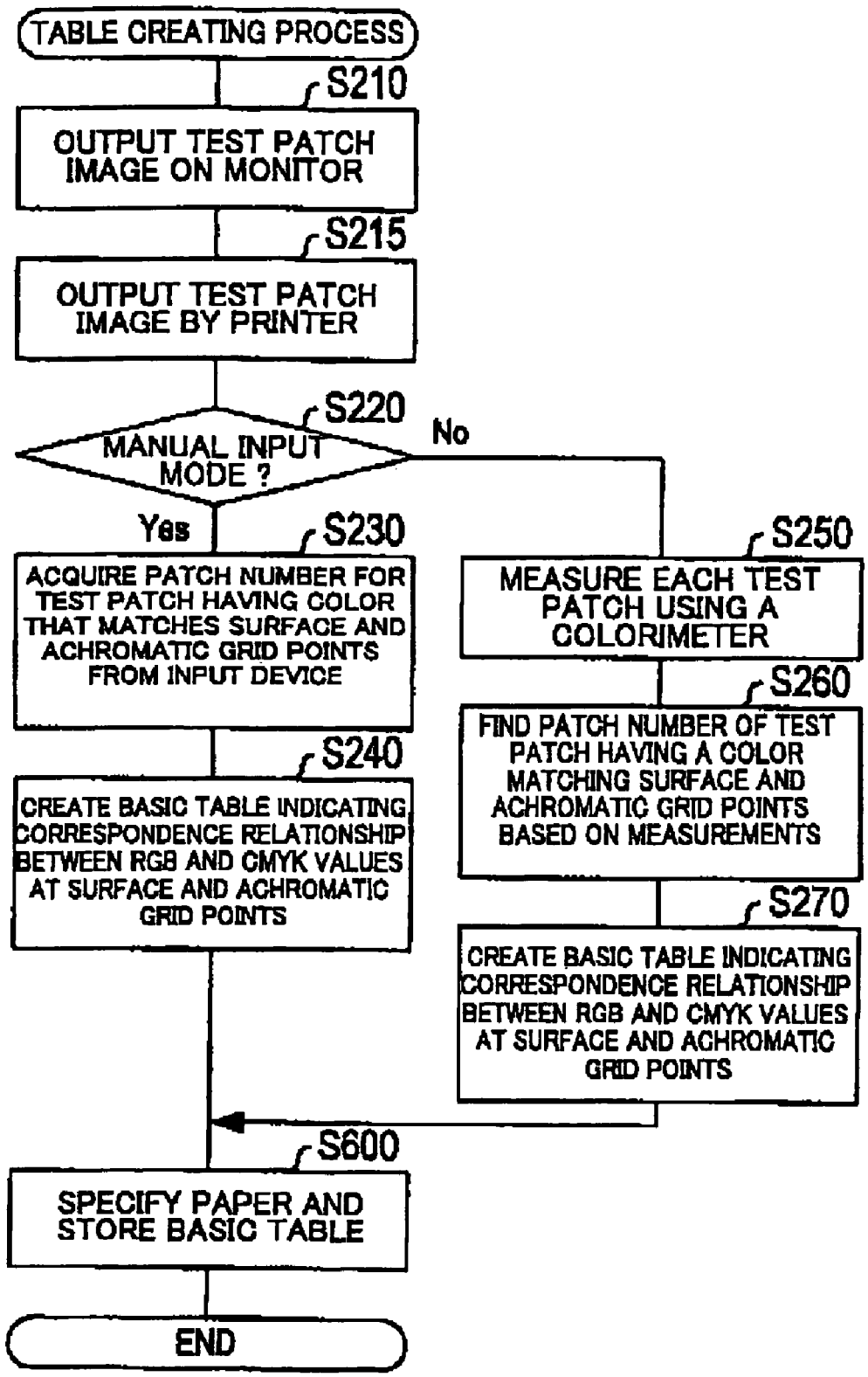
FIG. 14 is a flowchart illustrating steps in a table creating process executed by the CPU of the table creating device according to the modification.
Figure 15:
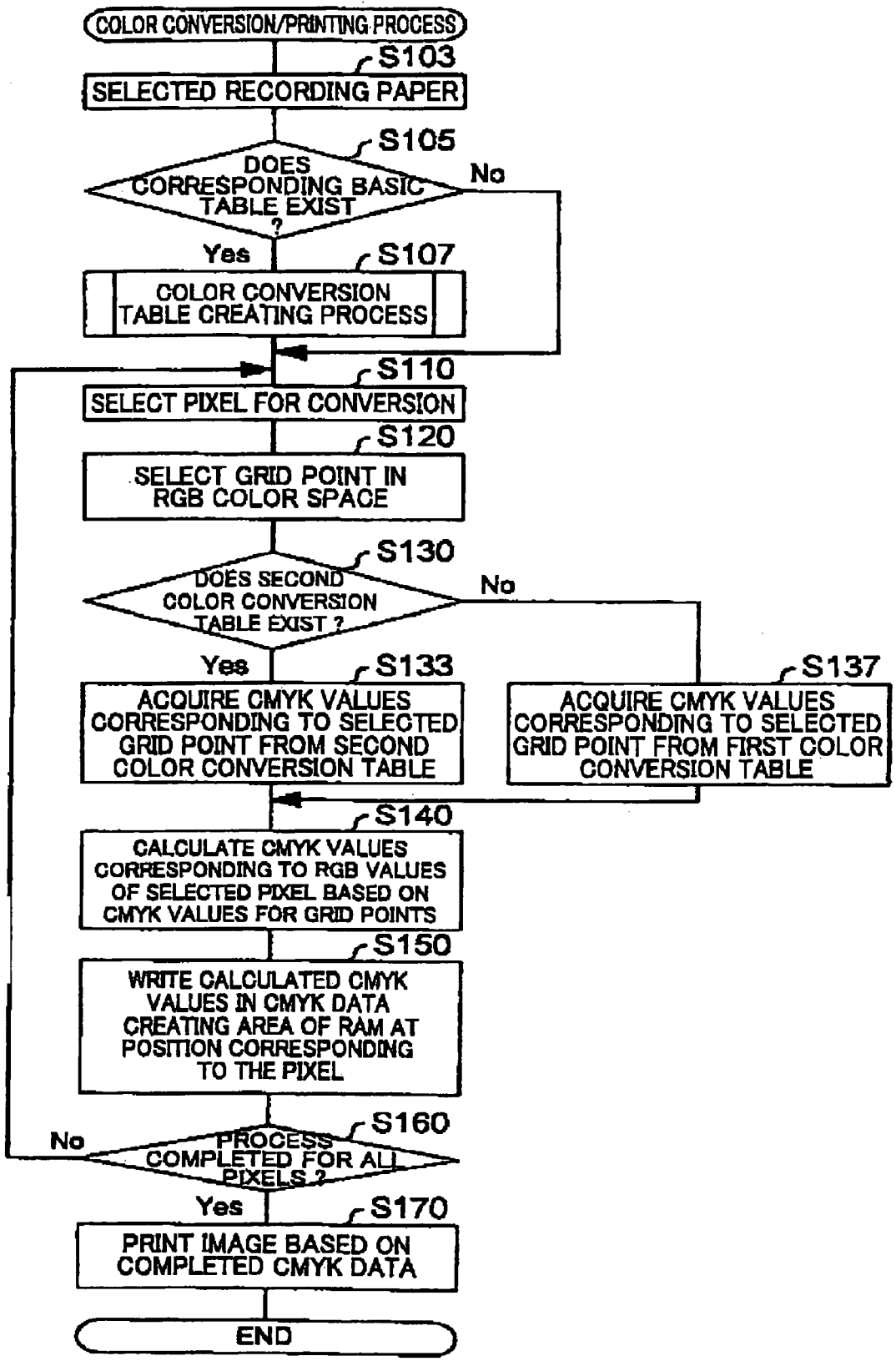
FIG. 15 is a flowchart illustrating steps in a color conversion/printing process executed by the CPU of the printer according to the modification.
Figure 16:
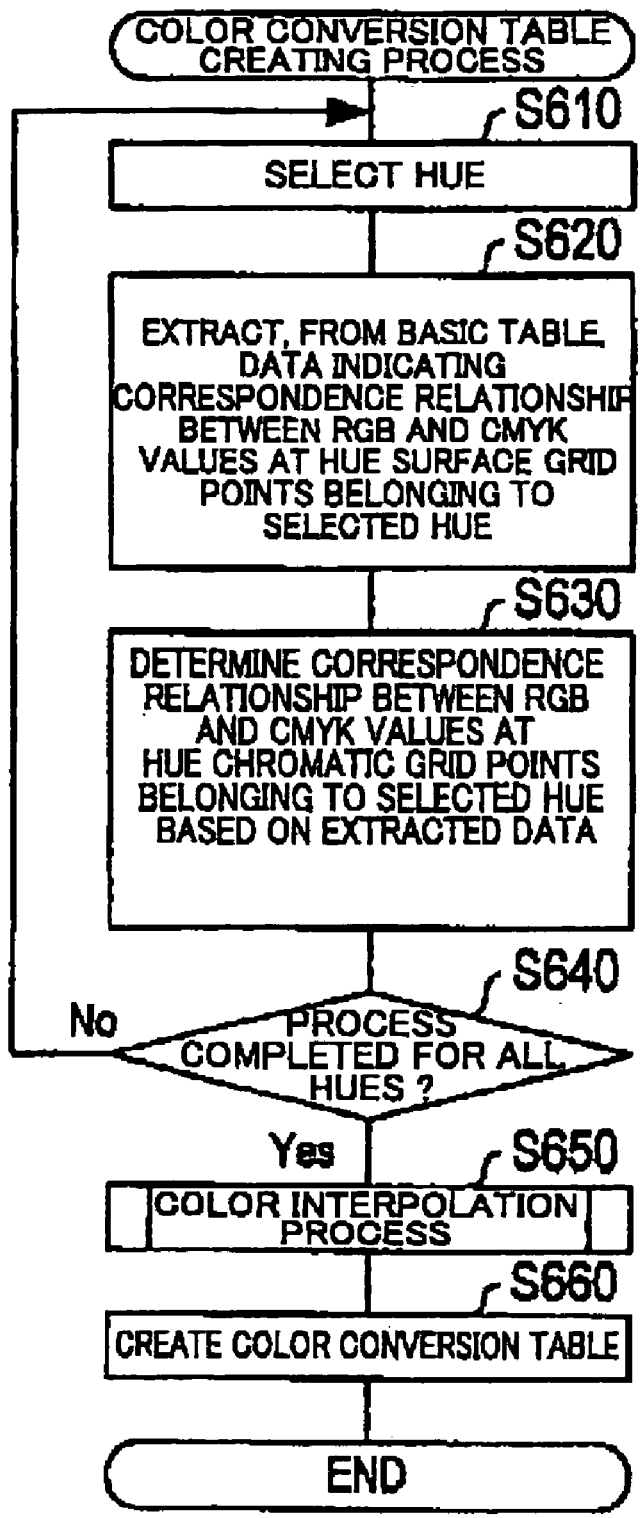
FIG. 16 is a flowchart illustrating steps in a color-conversion-table creating process executed by the CPU of the printer.

FIG. 13 is a block diagram showing the structure of the printer 40' according to the present modification. FIG. 14 is a flowchart showing steps in a table creating process executed by the CPU 11 in the table creating device 10' according to the present modification. FIG. 15 is a flowchart showing steps in a color conversion/printing process executed by the CPU 41 in the printer 40' according to the present modification. FIG. 16 is a flowchart showing steps in a color-conversion-table creating process executed by the CPU 41 in the printer 40'.

As shown in FIG. 13, a computer program 43b for implementing the processes shown in FIGS. 15 and 16 is stored in the ROM 43 of the printer 40'. One or a plurality of basic tables 441 and 442 is stored in the EEPROM 44' instead of the second color conversion table 44a. The EEPROM 44' stores a plurality of the basic tables 441 and 442 corresponding to types of recording paper, such as normal paper, heavy paper, and transparencies. The basic tables 441 and 442 are stored in the EEPROM 44' when the CPU 11 of the table creating device 10' executes the table creating process shown in FIG. 14.

The CPU 11 in the table creating device 10' performs the table creating process shown in FIG. 14 when the user inputs a table creating command through operations on the input device 19. In this process, the CPU 11 executes the same steps S210-S270 that were performed in the table creating process executed by the table creating device 10 described above. However, in the present modification, recording paper data indicating the type of recording paper is inputted through the input device 19 along with the table creating command. In S215 the test patch image is formed on recording paper of the type specified in the recording paper data. After step S240 or S270 in the table creating process of the modification, in S600 the basic table generated in S240 or S270 is stored in the EEPROM 44' as a basic table for the recording paper specified in the recording paper data.

Specifically, in S600 the CPU 11 inputs a command to store a basic table to the printer 40' via the printer interface 23 along with the recording paper data and the basic table to be stored. By doing so, the basic table generated in either S240 or S270 is stored in the EEPROM 44' of the printer 40'.

When the printer 40' receives the command to store a basic table from the table creating device 10' via the interface 49, the CPU 41 writes the basic table received together with the command in a predetermined area of the EEPROM 44' based on the recording paper data (a region of memory allocated for the specified recording paper). By writing the basic table to a region of the EEPROM 44' corresponding to the specified type of recording paper, the CPU 41 stores the basic table inputted from the table creating device 10' in the EEPROM 44' as the basic table to be used with the recording paper.

When the printer 40' receives a print command from an external device via the interface 49, the CPU 41 executes the color conversion/printing process shown in FIG. 15. In the present modification, a print command is inputted from an external device into the printer 40' together with RGB data and the recording paper data specifying the type of recording paper.

At the beginning of the color conversion/printing process according to the modification, the CPU 41 executes steps S103-S107 described below followed by steps S110-S170 of FIG. 3 described above. In S103 the CPU 41 selects a type of recording paper to be used for printing based on the recording paper data received from the external device so that the type of recording paper is used for printing in S170.

In S105 the CPU 41 determines whether a basic table for the recording paper is stored in a region of the EEPROM 44' corresponding to the selected type of recording paper. If the CPU 41 determines that a basic table for the selected type of paper is not stored in the EEPROM 44' (S105: NO), then the CPU 41 advances directly to S110. However, if the CPU 41 determines that a basic table for the selected recording paper is stored in the EEPROM 44' (S105: YES), then in S107 the CPU 41 executes the color-conversion-table creating process shown in FIG. 16.

In the computer program 43b stored in the ROM 43 for performing the process in FIG. 16, the CPU 41 is instructed to execute a process similar to steps S280-S330 of FIG. 4 described in the embodiment. Specifically, in S610 the CPU 41 selects one predetermined hue. In S620 the CPU 41 references the EEPROM 44' and extracts data from the basic table for the recording paper selected in S103 that expresses correspondence relationships between the RGB color space and CMYK color space for the selected hue, that is, correspondence relationships between hue surface grid points belonging to the selected hue and CMYK values; and correspondence relationships between achromatic grid points and CMYK values. Through this process, the CPU 41 can determine the correspondence relationship between RGB values and CMYK values at surface grid points and the correspondence relationship between RGB values and CMYK values at achromatic grid points.

In S630 the CPU 41 determines correspondence relationships between hue chromatic grid points belonging to the hue selected in S610 and each parameter in the CMYK color space based on the data extracted above and using the technique described above (refer to the description for S300).

After acquiring the correspondence relationships in S630, the CPU 41 determines in S640 whether the process of S630 has been completed for all hues.

If the process has not been completed for all hues (S640: NO), then the CPU 41 returns to S610, selects the next hue, and repeats the processes of S620-S640. However, if the CPU 41 determines that the above process has been completed for all hues (S640: YES), then in S650 the CPU 41 executes the color interpolation process shown in FIG. 10 to determine CMYK values corresponding to the remaining grid points in the RGB color space (grid points for which correspondence relationships with CMYK values have not yet been determined).

After completing the process in S650, the CPU 41 writes the RGB values for each surface grid point provided in the basic table for the selected recording paper and their corresponding CMYK values in the color conversion table creating area of the RAM 45. The CPU 41 also writes RGB values for each achromatic grid point provided in the basic table and their corresponding CMYK values in the color conversion table creating area of the RAM 45. The CPU 41 also writes the RGB values for each hue chromatic grid point for each hue determined in S630 and their corresponding CMYK values in the color conversion table creating area of the RAM 45.

In S660 the CPU 41 writes the RGB values for in-between chromatic grid points that were determined in S650 and their corresponding CMYK values to the color conversion table creating area of the RAM 45, thereby completing the color conversion table for indicating correspondence relationships between RGB values of each grid point in the RGB color space and CMYK values corresponding to the grid points. Through this process, the CPU 41 stores the color conversion table created in S660 in the RAM 45 as a second color conversion table. After completing S660, the CPU 41 ends the color-conversion-table creating process.

Returning to FIG. 15, the CPU 41 continues performing processes S110-S170. In S130 of the color conversion/printing process according to the modification, the CPU 41 determines whether a second color conversion table exists in the RAM 45. If the second color conversion table exists (S130: YES), the CPU 41 executes the process of S133. If not (S130: NO), the CPU 41 executes the process of S137. After completing these processes through S170, the CPU 41 ends the color conversion/printing process according to the present modification.

In the present modification, a color conversion table is created from the basic table by the printer 40'. Therefore, there is no need to store a plurality of color conversion tables in the printer 40', thereby requiring a lower capacity of memory (EEPROM or the like) to be provided in the printer 40'.

In S300 in the embodiment described above, CMYK values corresponding to grid points Pn were calculated based on CMYK values for points q0, q1, q2, and q3 in the CMYK color space corresponding to the four grid points p0, p1, p2, and p3. However, it is also possible to calculate CMYK values corresponding to grid points Pn based on CMYK values for a larger number of grid points, such as six grid points.

Figure 17:
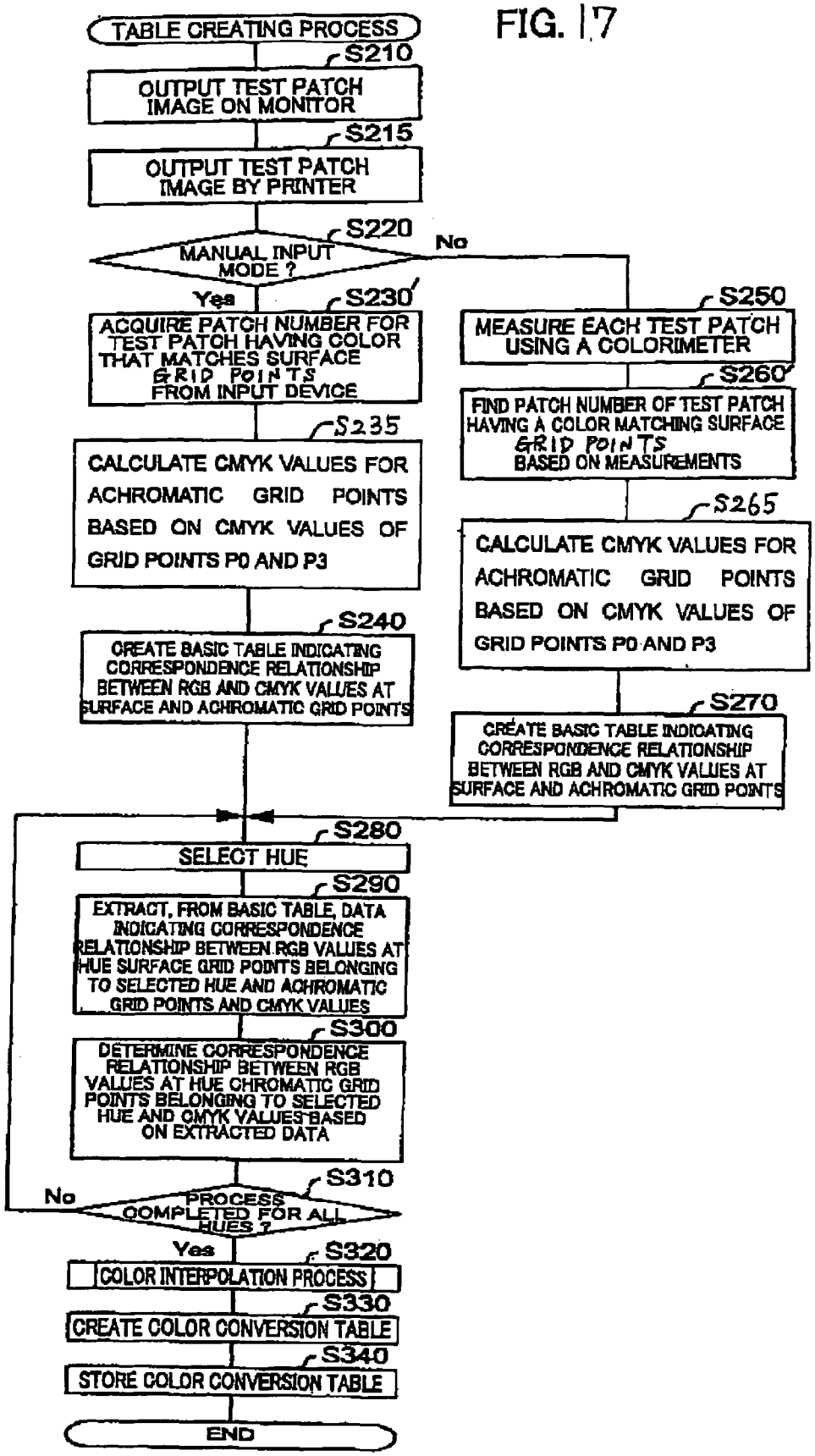
FIG. 17 is a flowchart showing steps in a color-conversion-table creating process according to another modification.

Further, in S230 and S240 in the embodiment described above, a basic table is created by obtaining, via the input device 19, CMYK values (patch numbers corresponding to CMYK values) corresponding to the achromatic grid points (the grid points on the line segment P0P3). However, in another modification shown in FIG. 17, in S230' the CPU 11 prompts the user to input information (patch numbers) for CMYK values corresponding to only the surface grid points in the RGB color space using the input device 19. In S235 the CPU 11 calculates CMYK values corresponding to the achromatic grid points through interpolation based on the CMYK values of grid points P0 and P3 and stores the calculated CMYK values for the achromatic grid points in the basic table. When not in the manual input mode, the CPU 11 executes similar processes in S260' and S265.

What is claimed is:

1. A color-conversion-table creating method comprising:
    (a) defining, with a color-conversion-table creating device, a color gamut in a first color space defined for a first device, the color gamut having a surface, an internal space surrounded by the surface, surface grid points positioned on the surface, and internal grid points positioned in the internal space; and determining a correspondence relationship between the surface grid points in the first color space and parameters in a second color space defined for a second device;
    (b) determining, by using linear interpolation based on the correspondence relationship determined in step (a), a correspondence relationship between the internal grid points in the first color space and parameters in the second color space; and
    (c) creating a color conversion table indicative of a correspondence relationship between all grid points in the first color space and parameters in the second color space based on both the correspondence relationship determined in step (a) and the correspondence relationship determined in step (b), the all grid points including the surface grid points and the internal grid points, allowing the color conversion table to be used for converting image data represented in the first color space into image data represented in the second color space; wherein:
    a predetermined plurality of hues are defined in the color gamut;
    the surface grid points include hue surface grid points belonging to the predetermined plurality of hues;
    the internal grid points include hue internal grid points belonging to the predetermined plurality of hues and in-between internal grid points positioned between the hue internal grid points; and step (b) includes:

(d) determining, for each of the predetermined plurality of hues, a correspondence relationship between the hue internal grid points and parameters in the second color space, by using linear interpolation based on the relationship between the hue surface grid points and the parameters in the second color space.

2. The color-conversion-table creating method as claimed in claim 1, wherein step (a) includes:

measuring, by a colorimeter, an output image of the first device and an output image of the second device, thereby obtaining measurement values; and determining, based on the measurement values, the correspondence relationship between the surface grid points in the first color space and the parameters in the second color space.

3. The color-conversion-table creating method as claimed in claim 1, wherein step (a) includes:

obtaining information inputted by a user through an inputting unit; and determining, based on the information, the correspondence relationship between the surface grid points in the first color space and the parameters in the second color space.

4. The color-conversion table creating method as claimed in claim 1, wherein step (b) further includes:

(e) determining a correspondence relationship between the in-between internal grid points and parameters in the second color space, by linear interpolation based on the correspondence relationship between the hue internal grid points and the parameters in the second color space determined in step (d).

5. A color-conversion-table creating device comprising:

a first determining portion defining a color gamut in a first color space defined for a first device, the color gamut having a surface, an internal space surrounded by the surface, surface grid points positioned on the surface, and internal grid points positioned in the internal space; and determining a correspondence relationship between the surface grid points in the first color space and parameters in a second color space defined for a second device;

a second determining portion determining, by using linear interpolation based on the correspondence relationship determined by the first determining portion, a correspondence relationship between the internal grid points in the first color space and parameters in the second color space; and a creating portion creating a color conversion table indicative of a correspondence relationship between all grid points in the first color space and parameters in the second color space based on both the correspondence relationship determined by the first determining portion and the correspondence relationship determined by the second determining portion, the all grid points including the surface grid points and the internal grid points, allowing the color conversion table to be used for converting image data represented in the first color space into image data represented in the second color space; wherein:

a predetermined plurality of hues is defined in the color gamut;

the surface grid points include hue surface grid points belonging to the predetermined plurality of hues;

the internal grid points include hue internal grid points belonging to the predetermined plurality of hues and in-between internal grid points positioned between the hue internal grid points; and the second determining portion determines, for each of the predetermined plurality of hues, a correspondence relationship between the hue internal grid points and parameters in the second color space, based on the relationship between the hue surface grid points and the parameters in the second color space.

6. The color-conversion-table creating device as claimed in claim 5, wherein the first determining portion includes:

a measuring portion measuring, by a colorimeter, an output image of the first device and an output image of the second device, thereby obtaining measurement values; and a third determining portion determining, based on the measurement values, the correspondence relationship between the surface grid points in the first color space and the parameters in the second color space.

7. The color-conversion-table creating device as claimed in claim 5, wherein the first determining portion includes:

an obtaining portion obtaining information inputted by a user through an inputting unit; and a third determining portion determining, based on the information, the correspondence relationship between the surface grid points in the first color space and the parameters in the second color space.

8. The color-conversion-table creating device as claimed in claim 5, wherein the second determining portion determines a correspondence relationship between the in-between internal grid points and parameters in the second color space, by linear interpolation based on the correspondence relationship between the hue internal grid points and the parameters in the second color space.

* * * * *